(12) United States Patent
Templeton et al.

(10) Patent No.: US 7,873,566 B1
(45) Date of Patent: Jan. 18, 2011

(54) SYSTEMS AND METHODS FOR SELECTIVELY ACCESSING OR USING FINANCIAL ACCOUNT DATA FOR SUBSEQUENT RISK DETERMINATION

(75) Inventors: Randy Templeton, Sugarland, TX (US);
Tamila Barron, Fresno, CA (US);
Daniel Ahles, Houston, TX (US);
Sharat Shankar, Houston, TX (US)

(73) Assignee: First Data Corporation, Greenwood Village, CO (US)

( * ) Notice: Subject to any disclaimer, the term of this patent is extended or adjusted under 35 U.S.C. 154(b) by 1664 days.

(21) Appl. No.: 10/302,796

(22) Filed: Nov. 20, 2002

Related U.S. Application Data

(60) Provisional application No. 60/332,046, filed on Nov. 20, 2001.

(51) Int. Cl.
*G06Q 40/00* (2006.01)
(52) U.S. Cl. .................. 705/38; 705/35; 705/45
(58) Field of Classification Search ............ 705/35, 705/38, 39, 4, 45
See application file for complete search history.

(56) References Cited

U.S. PATENT DOCUMENTS

| | | | | |
|---|---|---|---|---|
| 4,727,243 | A | | 2/1988 | Savar |
| 5,175,682 | A | * | 12/1992 | Higashiyama et al. ........ 705/45 |
| 5,237,159 | A | * | 8/1993 | Stephens et al. ............. 705/30 |
| 5,444,616 | A | * | 8/1995 | Nair et al. .................... 705/17 |
| 5,484,988 | A | | 1/1996 | Hills et al. |
| 5,677,955 | A | | 10/1997 | Doggett et al. |
| 5,679,938 | A | * | 10/1997 | Templeton et al. .......... 235/379 |
| 5,679,940 | A | | 10/1997 | Templeton et al. |
| 5,691,524 | A | * | 11/1997 | Josephson .................... 705/40 |
| 5,703,344 | A | * | 12/1997 | Bezy et al. ................... 235/379 |
| 5,801,366 | A | * | 9/1998 | Funk et al. ................... 235/380 |
| 5,848,400 | A | * | 12/1998 | Chang ........................ 705/35 |
| 5,848,412 | A | * | 12/1998 | Rowland et al. .............. 707/9 |
| 5,920,847 | A | | 7/1999 | Kolling et al. |
| 5,930,777 | A | * | 7/1999 | Barber ........................ 705/40 |

(Continued)

OTHER PUBLICATIONS

Piskora, Beth. "Three big check acceptance companies sign up with fledgling verification outfit". American Banker, New York, NY, Jan. 30, 1996. vol. 161, Iss. 19. (3 pages).

(Continued)

*Primary Examiner*—James A Kramer
*Assistant Examiner*—Hao Fu
(74) *Attorney, Agent, or Firm*—Sutherland Asbill & Brennan LLP

(57) ABSTRACT

Systems and methods are provided for selectively determining when and from what source to access information received from a demand deposit account (DDA) associated with a given check or other promissory payment transaction, as well as for selectively incorporating the DDA information into a risk assessment for the transaction. Information received from the DDA can include an indication of the existence of sufficient funds in the account (or lack thereof) to cover the check in question, as well as a current status code for the account. Use of the DDA information may be integrated into an overall risk assessment process performed for the transaction, such that the influence of negative factors in one part of the risk assessment may be mitigated by other factors in the risk assessment and such that overall effectiveness of the risk assessment is enhanced. Systems and methods for selecting an access path for accessing a DDA to settle a promissory payment are also provided.

79 Claims, 16 Drawing Sheets

U.S. PATENT DOCUMENTS

| | | | |
|---|---|---|---|
| 5,991,758 A * | 11/1999 | Ellard | 707/6 |
| 6,059,185 A * | 5/2000 | Funk et al. | 235/379 |
| 6,097,834 A * | 8/2000 | Krouse et al. | 382/137 |
| 6,105,011 A | 8/2000 | Morrison | |
| 6,117,011 A * | 9/2000 | Lvov | 463/25 |
| 6,164,528 A | 12/2000 | Hills et al. | |
| 6,189,785 B1 * | 2/2001 | Lowery | 235/379 |
| 6,247,000 B1 | 6/2001 | Hawkins | |
| 6,283,366 B1 | 9/2001 | Hills et al. | |
| 6,354,491 B2 | 3/2002 | Nichols et al. | |
| 6,411,942 B1 | 6/2002 | Fujimoto | |
| 6,430,539 B1 | 8/2002 | Lazaris et al. | |
| 6,647,376 B1 | 11/2003 | Ferrar | |
| 6,658,393 B1 | 12/2003 | Basche et al. | |
| 6,661,910 B2 | 12/2003 | Jones et al. | |
| 6,757,664 B1 | 6/2004 | Cardinal et al. | |
| 6,839,682 B1 | 1/2005 | Blume et al. | |
| 6,856,965 B1 | 2/2005 | Stinson et al. | |
| 6,999,943 B1 | 2/2006 | Johnson et al. | |
| 7,080,049 B2 | 7/2006 | Truitt et al. | |
| 7,200,578 B2 | 4/2007 | Paltenghe et al. | |
| 7,251,624 B1 | 7/2007 | Lee et al. | |
| 7,275,046 B1 | 9/2007 | Tritt et al. | |
| 7,333,953 B1 | 2/2008 | Banaugh et al. | |
| 2001/0037299 A1 | 11/2001 | Nichols et al. | |
| 2002/0032645 A1 | 3/2002 | Nozaki | |
| 2002/0040344 A1 | 4/2002 | Preiser et al. | |
| 2002/0052852 A1 | 5/2002 | Bozeman | |
| 2002/0091550 A1 * | 7/2002 | White et al. | 705/4 |
| 2002/0116323 A1 | 8/2002 | Schnall | |
| 2002/0178112 A1 | 11/2002 | Goeller et al. | |
| 2003/0023557 A1 | 1/2003 | Moore | |
| 2003/0032645 A1 | 2/2003 | Gilbert | |
| 2003/0033252 A1 | 2/2003 | Buttridge et al. | |
| 2003/0093368 A1 | 5/2003 | Manfre et al. | |
| 2003/0217003 A1 | 11/2003 | Weinflash | |
| 2004/0034583 A1 | 2/2004 | Lanier et al. | |
| 2004/0044606 A1 | 3/2004 | Buttridge et al. | |

OTHER PUBLICATIONS

Kumar, Ashok & Motwani, Jaideep. "Reengineering the lending procedure for small businesses: a case study". Work Study. London. 1999. vol. 48, Iss. 1. (11 pages).

U.S. Appl. No. 10/302,745, Systems and methods for selectively accessing financial account information.

U.S. Appl. No. 10/302,051, Systems and Methods for Selectively Accessing a Source of Financial Account Data.

U.S. Appl. No. 10/302,779, Systems and Methods for Settling a Transaction.

U.S. Appl. No. 10/302,780, Systems and Methods for Selectively Accessing or Using Financial Account Information Prior to Risk Determination.

U.S. Appl. No. 10/302,770, Systems and Methods for Selectively Accessing or Using Financial Acount Information for Risk Determination.

U.S. Appl. No. 10/302,796, Systems and Methods for Selectively Accessing or Using Financial Account Data for Subsequent Risk Determination.

Piskora, Beth, "Three big check acceptance companies sign up with fledgling verification outfit". American Banker, Jan. 30, 1996. vol. 161, Iss. 19, (3 pages), New York, NY.

Kumar, Ashok & Motwani, Jaideep, "Reengineering the lending procedure for small businesses: a case study". Work Study. 1999. vol. 48, Iss. 1. (11 pages), London.

Morrison, Jeff, "Introducing C.A.R.T. to the forecasting process" The Journal of Business Forecasting, Spring 1998, pp. 9-12.

Supplemental Disclosure Under 37 C.F.R. 1.56 dated Mar. 31, 2009, filed for U.S. Appl. No. 10/302,796.

Supplemental Disclosure Under 37 C.F.R. 1.56 dated Nov. 18, 2009, filed for U.S. Appl. No. 10/302,796.

Kreis, J. Daniel "Comment: Don't Overreact to Changes in Credit Scores" Mar. 17, 1998 American Banker; vol.163, No. 51; p 14.

Wayne Mattingly "Messenger-Inquirer, Owensboro, KY., Wayne Mattingly Column" Mar. 20, 2000 Messenger-Inquirer, Owensboro, KY.

Robida et al. "How many scorecards do I need for my business lending environment?" Jun. 2000 Business Credit, v 102, n 6, p. 36-38.

* cited by examiner

| STATUS CODE | INTERPRETATION |
|---|---|
| NFD | Account not found; requested account does not exist |
| NDD | Account is not a DDA account |
| VAL | Account is open, with sufficient funds for the requested amount |
| NSF | Account is open, but does not have sufficient funds to cover the requested amount |
| NFZ | Account is open, with a balance less than zero |
| CLT | Account is closed temporarily |
| CLP | Account is closed permanently |
| CLC | Account was closed for cause, based on unacceptable behavior by the customer |

FIG. 4

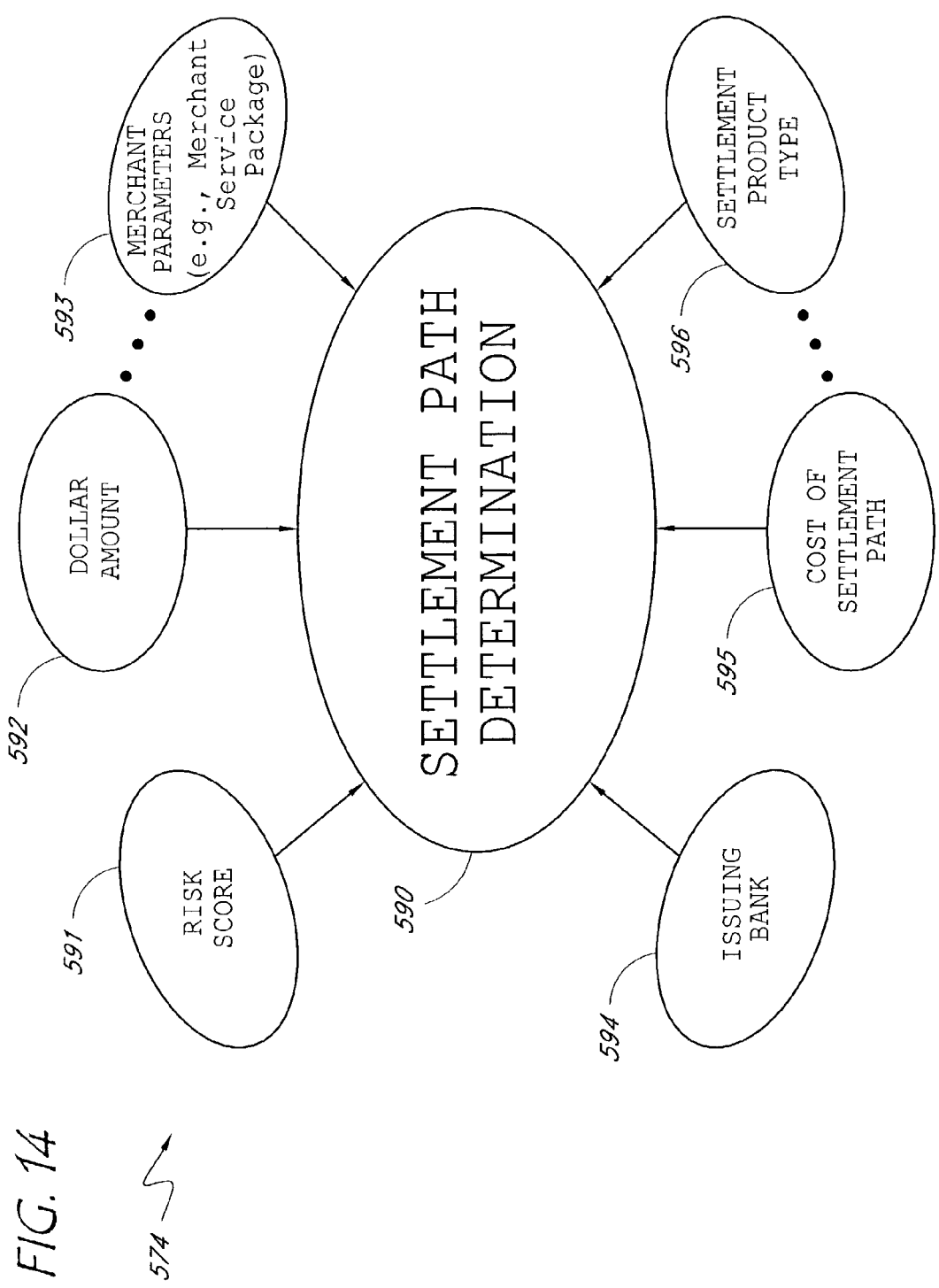

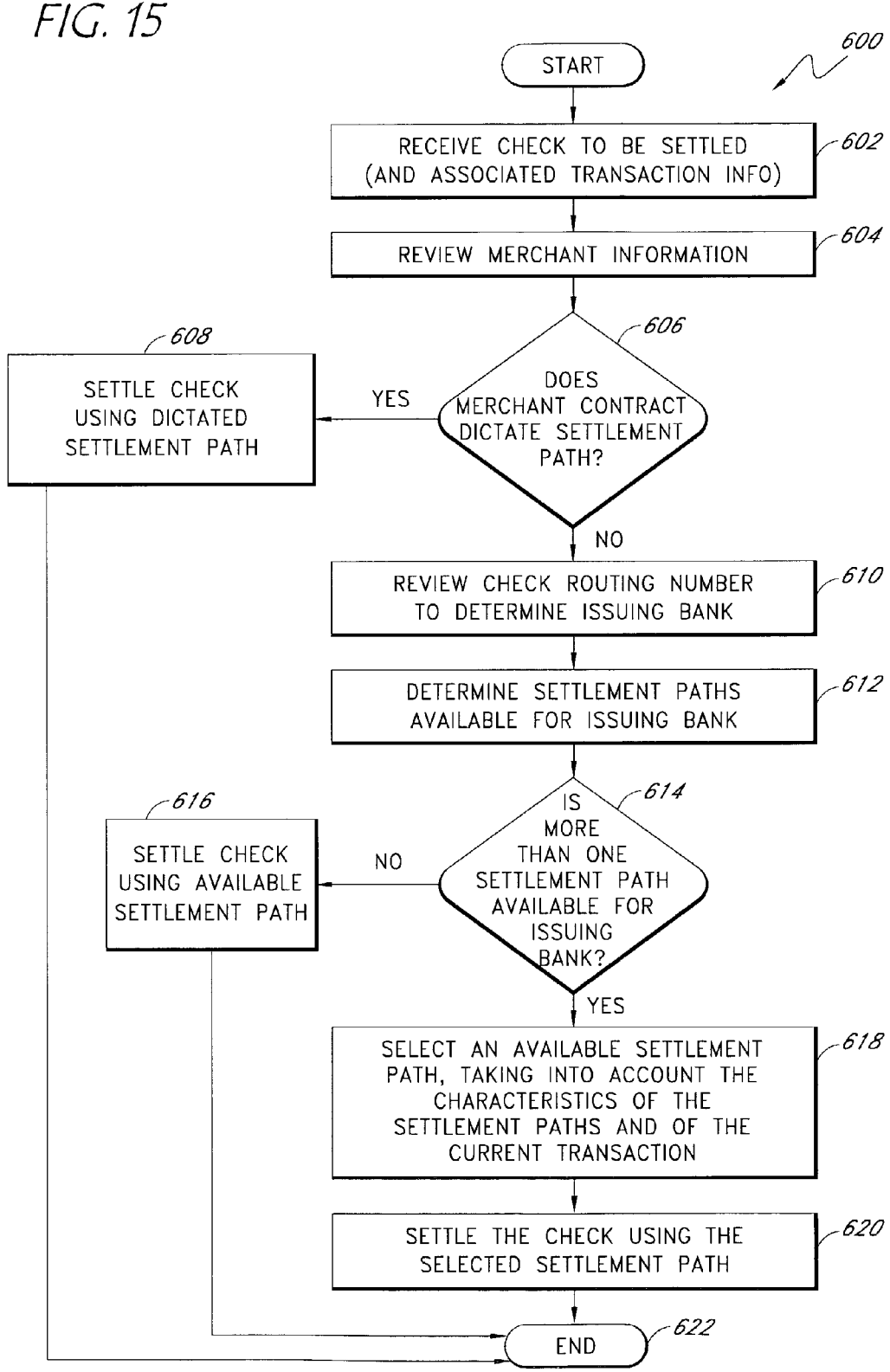

SYSTEMS AND METHODS FOR SELECTIVELY ACCESSING OR USING FINANCIAL ACCOUNT DATA FOR SUBSEQUENT RISK DETERMINATION

PRIORITY CLAIMS

The present application claims priority benefit under 35 U.S.C. 119(e) from U.S. Provisional Application No. 60/332, 046, filed Nov. 20, 2001, entitled SYSTEMS AND METHODS FOR SELECTIVELY ACCESSING FINANCIAL INFORMATION, which is hereby incorporated herein in its entirety by reference.

RELATED APPLICATIONS

The present application is related to pending U.S. patent application Ser. No. 10/041,955, filed Jan. 7, 2002, entitled SYSTEMS AND METHODS FOR SELECTIVE USE OF DATABASES TO PREDICT FINANCIAL RISK, and to U.S. patent application Ser. No. 10/041,765, filed Jan. 7, 2002, entitled SYSTEMS AND METHODS FOR SELECTIVE USE OF RISK MODELS TO PREDICT FINANCIAL RISK, which are incorporated hereby in their entireties by reference.

BACKGROUND OF THE INVENTION

1. Field of the Invention

This invention relates generally to risk assessment, and, more particularly, to systems and methods for evaluating risks associated with financial transactions.

2. Description of the Related Art

Most financial transactions involve a customer making a payment to a merchant in exchange for goods or services. Many times the payment is in a promissory form, such as a check or debit card, that instructs the customer's bank to pay the merchant from a demand deposit account (DDA). A DDA is an account, such as a checking account, whose balance can be drawn upon on demand, for example, without prior notice. As is well known, the funds promised by the check are sometimes not paid, due to reasons such as insufficient funds in the customer's checking account or fraud. Examples of fraud include, but are not limited to, payments made with checks or debit cards that are stolen, counterfeit, or written for accounts that no longer exist. Thus, although it may be considered good business practice for a merchant to accept promissory DDA payments, the merchant is taking a risk whenever a check or other promissory DDA payment is accepted in exchange for goods or services.

In order to manage these and other financial transaction risks, some merchants subscribe to a service that assesses risks associated with financial transactions. For a given check transaction, a subscribed merchant can send a point-of-sale transaction approval request to the service with information, such as check amount, account identification, and check-writer identification. The service assesses the risk and either authorizes or declines the transaction based on the risk assessment.

The level of subscription to such a service can vary from a service that simply recommends check approval or disapproval to a service that assumes the risk of the transaction by either guaranteeing the check or purchasing the check from the merchant. Thus, it is in the interest of the service to accurately assess the transaction risks.

Check approval systems use a variety of methods to assess risk. Some examples of risk assessment methods include, but are not limited to, reference to historical data about past transactions involving a given customer or a given DDA, and reliance on statistical data gathered about typical risk levels associated with various types of transactions and/or types of merchants. In order to assess a transaction risk, some check approval systems may calculate a risk score based on data received from the merchant regarding this transaction (e.g., check amount, check account identification, and merchant identification) along with other historical data stored by the check approval service (e.g., past performance of checks from this check account, past performance of customers at this merchant, etc.). These and other methods can be used by a check approval service with an aim to providing an accurate risk assessment.

A check approval system is generally configured to approve or to disapprove acceptance of a check in a manner that statistically favors the merchant or the check approval service in terms of probable risk. Thus, transactions categorized as being of borderline high risk, either because of a calculated risk score or because of some other method of risk categorization, may be difficult to assess accurately and may be preemptively declined.

This fact has two unfortunate consequences. For one, good sales may be lost. As an example, a financially responsible check-writer may move to a new area and establish a new checking account. When a check drawn from the new account is processed by the check approval service, a lack of previous historical data for that checking account in the service's databases may lead to the merchant declining the check, and a potentially good sale is lost. A more far-reaching consequence of over-declining borderline risk transactions is the possibility of stimulating negative sentiment towards the merchant on the part of potential purchasers.

In an effort to increase the accuracy of risk assessment, an additional type of potentially relevant information is information directly about the DDA. Two components of DDA information that can be useful are (1) whether the DDA currently holds sufficient funds to cover the check in question and (2) the current status of the DDA (for example, Closed, Open, or Overdrawn). Information for a given DDA may be available by direct access to the bank or other financial institution that holds the DDA on which the check is written, by indirect access via a third party to the financial institution holding the DDA, by request to a separate entity that holds DDA information, or by consulting an internal database, if such a database is maintained, that holds current or near-current information about the DDAs in one or more financial institutions.

DDA information can provide valuable input for making a check approval decision. Currently, financial service providers that have access to DDA information for a given transaction use such information to make an accept/decline decision for the transaction.

However, in some situations DDA information does not significantly add to the ability to make an accurate risk assessment. Many transactions occur that may be assessed relatively easily and unambiguously as being high-risk or low-risk without the input of DDA information.

Furthermore, various types of costs are involved in a DDA access. For example, processing a DDA information access request typically requires a certain amount of time. If an accept/decline decision is being made while a customer is waits at a point-of-sale checkout stand, minimizing wait times may be desirable. Another cost involved in accessing DDA information may be a fee charged by the bank, financial institution, or other provider of the DDA information. Other financial considerations may also be relevant. Furthermore, expenditures of other resources, such as processor time and bandwidth, may be associated with a request for access to DDA information.

Thus, automatic access to DDA information for every transaction may not be beneficial from the point of view of a cost/benefit analysis. The ability to distinguish between check transaction risk assessments that do benefit from access to DDA information and those that do not is therefore valuable input to a check approval decision.

Similarly, current financial service providers that have access to DDA information for a given transaction use the information as a sole decision-making factor.

However, DDA information does not always provide definitive, unambiguous input that makes decision-making automatic, especially given the desire to limit unnecessary check declines. Many other factors are relevant to an accurate assessment of risk. For example, a good customer may write a check on the day before her payday for an amount that she currently does not have in her account, but for which she will have sufficient funds by the time the check clears her account. Decision-making based strictly on current DDA information would unnecessarily turn down this check, whereas a system that takes into account the check-writer's positive historical payment performance might not.

Accessing a DDA may also be desired for final settlement (cashing) of a check or other promissory payment instrument. Several access methods, or paths, exist for accessing DDA information and for the settlement of promissory payment instruments in paper or electronic formats. Use of each of these access paths is associated with a different set of costs (such as fees, time delays, bandwidth, and other resources) and benefits (such as speed of processing, guarantees, and other complementary services), although these costs and benefits are not typically considered in choosing a settlement path when more than one path is available.

Therefore, there is a need for systems and methods that allow for intelligent decision-making regarding when to access DDAs for information, how to access DDAs for information and/or settlement, and how to use information received regarding a DDA for accurate risk assessment.

SUMMARY OF THE INVENTION

Systems and methods are provided for selectively incorporating information received from a demand deposit account (DDA) associated with a given check transaction into a risk assessment requested by a merchant for the transaction. A DDA is an account, such as a checking account, whose balance can be drawn upon on demand, for example, without prior notice. Information received from the DDA can include, for example, an indication of the existence of sufficient funds in the account (or lack thereof) to cover the check in question, as well as a current status (such as Open, Closed, Overdrawn) for the account.

DDA information can be very relevant to a decision regarding the advisability of accepting a promissory payment in exchange for goods or services. However, the mere ability to access DDA information does not dictate that expending the resources to access DDA information will always result in a higher degree of predictive accuracy. Although DDA information can provide input that is highly relevant to the risk-assessment associated with a given transaction and that is not easily duplicated by other means, in-depth risk-assessment is not a requirement for a large number of check transactions, and assessing these transactions may not be significantly enhanced by access to DDA information.

Given that accessing DDA information involves the expenditure of resources such as time, money, and processing capabilities, the ability to distinguish between check transaction risk assessments that do benefit from access to DDA information and those that do not is therefore valuable to a check acceptance service. This is especially true from a point of view of cost- and time-effectiveness and when keeping in mind that risk assessment for check transactions such as those described herein is typically undertaken while a customer is waiting at a point of sale. Systems and methods are therefore described for deciding whether to expend the resources to access DDA information for a given transaction based on details associated with the transaction.

Similarly, various embodiments of systems and methods for integrating the use of DDA information with other information, such as, for example, details about the current transaction and/or historical information about the check-writer, as part of a comprehensive risk assessment are described. For example, use of DDA information as one factor in calculating a risk score is described, as well as use of DDA information for overturning or confirming a preliminary accept/decline decision for an offered promissory payment from a DDA. The use of DDA information may be integrated into an overall risk assessment process performed for the transaction, such that the influence of positive or negative factors in one part of the risk assessment may be mitigated by other factors in the risk assessment and such that overall effectiveness of the risk assessment is enhanced.

A method is described for evaluating the risk of a merchant accepting a proffered promissory payment in a financial transaction. The method further provides an indication to the merchant to accept or to decline the promissory payment, where the payment is drawn on a demand deposit account (DDA). The method comprises receiving information about the financial transaction that comprises at least one of: information about the promissory payment, information about an individual proffering the promissory payment, and information about the merchant. The method further comprises accessing additional associated information that comprises at least one of: information about a payment history associated with the individual, other information relevant to a risk evaluation of accepting a promissory payment from the individual, information about a service agreement with the merchant that stipulates characteristics of the risk assessment, information about risk patterns associated with the merchant, and information about the DDA on which the promissory payment is drawn. The method further comprises using at least some of the received information and the additional associated information to perform an initial risk assessment indicative of a level of risk associated with accepting the promissory payment. The method further comprises determining if further risk assessment is desirable to confirm or to overturn the initial risk assessment. The method further comprises performing further risk assessment, if desirable, based at least in part on the DDA information, to determine if a risk level associated with accepting the promissory payment is acceptable or unacceptable. The method further comprises providing an indication to the merchant to accept the promissory payment if the risk level is determined to be acceptable and to decline the promissory payment if the risk level is determined to be unacceptable.

A system is described for assessing the risk of accepting a proffered promissory payment and for providing an indication of the assessment to a merchant who has been proffered the promissory payment. The system comprises a risk assessment component that performs an initial assessment of the risk of accepting the proffered promissory payment to categorize the risk of accepting the payment as acceptable or unacceptable or borderline, and that selectively performs a subsequent risk assessment using information received in response to a request for DDA information to refine the initial assessment. The risk assessment component further provides an indication to the merchant, based on the subsequent risk assessment, as to whether to accept or to decline the proffered payment.

A method of assessing the risk of accepting a promissory payment that is proffered in a transaction is described. The method comprises transmitting information about the proffered payment from a point of sale device to a central location. The method further comprises evaluating the risk of accepting the proffered promissory payment. The evaluation categorizes the risk into at least a category of acceptable risk and unacceptable risk. The method further comprises determining, if the risk is unacceptable, whether to re-evaluate the risk. The method further comprises re-evaluating the risk of accepting the proffered promissory payment based at least in part on information about the demand deposit account (DDA) that corresponds to the proffered promissory payment.

A method for determining whether to accept a check offered as payment in a check transaction is described. The method comprises receiving electronic information about a demand deposit account (DDA) against which a check that is offered as payment in a check transaction is drawn. The method further comprises generating a risk score indicative of a predicted level of risk for the check transaction. The method further comprises, based at least in part on the risk score, selectively integrating use of the information from the DDA together with use of other information associated with the check transaction to generate a second risk score, wherein the manner of selectively integrating the DDA information and the other information is determined, at least in part, based on characteristics of the check transaction. The method further comprises determining to accept the check if the second risk score indicates an acceptable level of risk associated with accepting the check and to decline the check if the second risk score indicates an unacceptable level of risk associated with accepting the check.

A method for determining whether to authorize acceptance of a promissory payment offered from a demand deposit account is described. The method comprises accessing electronic information about a demand deposit account from which a promissory payment has been offered. The method further comprises using at least one of a plurality of available risk engines to generate a score, or other generated evaluation, that is indicative of a level of risk predicted for the promissory payment, to make an authorization decision. The method further comprises re-evaluating the authorization decision, based at least in part on the demand deposit account information.

A method is described for assessing risk associated with a merchant accepting a promissory payment in a financial transaction, wherein the method utilizes a scoring process to determine a risk score for the transaction. The method further utilizes information received from a demand deposit account (DDA) on which the promissory payment is drawn for use in enhancing the scoring process. The method comprises identifying the promissory payment for which the merchant desires risk assessment. The method further comprises receiving information from the DDA against which the promissory payment is drawn. The method further comprises calculating an initial risk score for the transaction. The method further comprises selectively utilizing the information from the DDA in conjunction with the initial risk score to enhance the risk score for the transaction. The method further comprises providing an indication of the risk assessment associated with accepting the promissory payment to the merchant.

A system is described for determining whether to accept a promissory payment proffered in a financial transaction. The system comprises means for receiving electronic information about a demand deposit account (DDA) against which the promissory payment is drawn. The system further comprises means for generating a risk level assessment associated with accepting the proffered payment. The system further comprises means for selectively integrating use of the electronic information about the DDA together with use of other information associated with the transaction to generate a re-evaluated risk level assessment. The manner of selectively integrating the demand deposit account information and the other information is determined, at least in part, based on characteristics of the transaction. The system further comprises means for determining, based at least in part on the re-evaluated risk level assessment, whether to accept the promissory payment.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 4 depicts one embodiment of a set of DDA response codes.

FIG. 14 depicts exemplary factors that influence settlement path selection.

FIG. 15 is a flow chart depicting a more detailed view of one embodiment of a process to select a settlement path for settling a check.

DETAILED DESCRIPTION OF THE PREFERRED EMBODIMENTS

Reference will now be made to the drawings wherein like numerals refer to like parts throughout.

Overview

Figure 1:
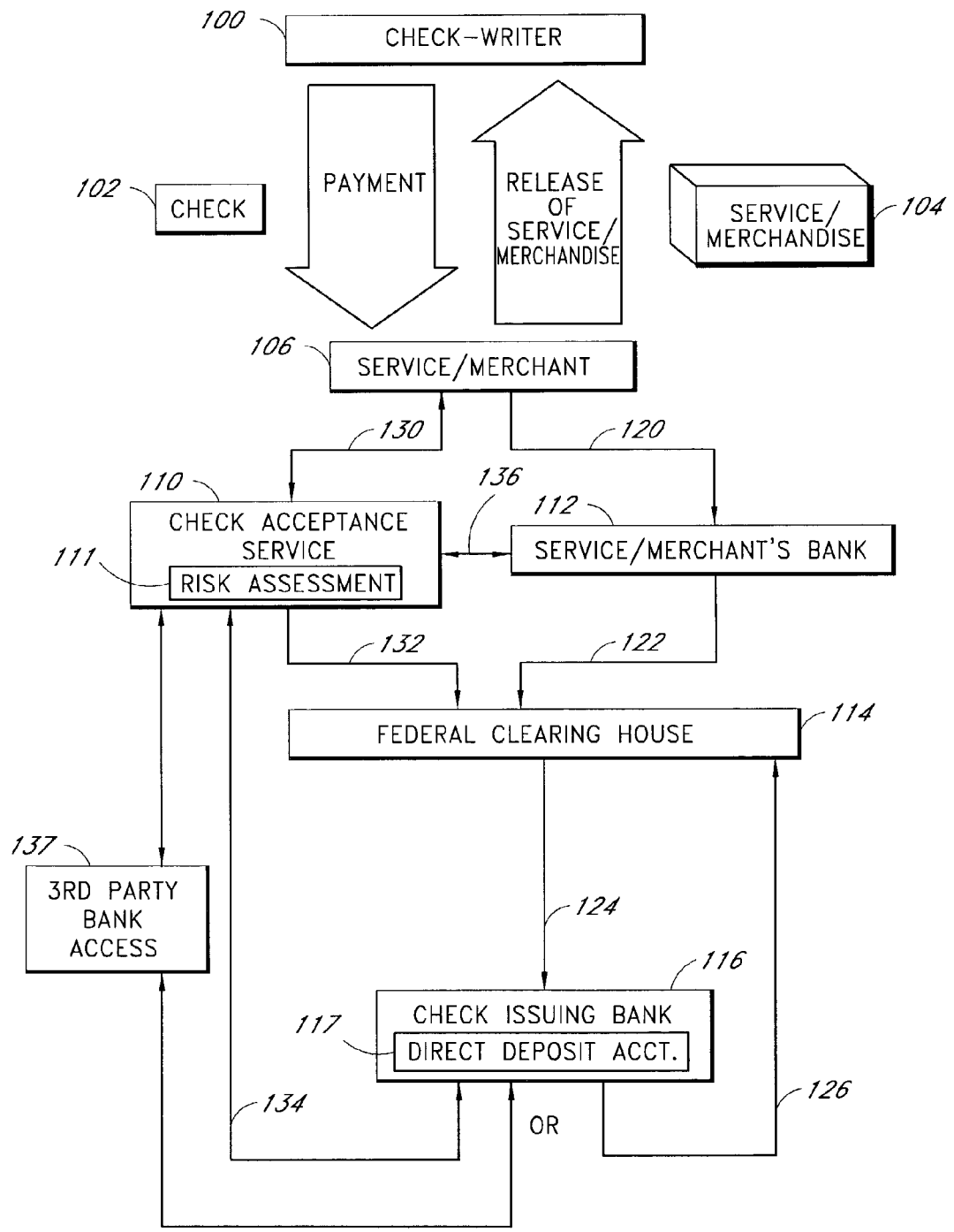
FIG. 1 illustrates a general overview of an example check transaction.

FIG. 1 presents a block diagram of a typical financial transaction involving a promissory payment in the form of a check. A check-writer 100 writes a check 102 and proffers the check to a service or a merchant 106 (referred to as merchant hereinafter) in exchange for a service and/or merchandise 104 (referred to as merchandise hereinafter). The check 102 authorizes withdrawal of funds from a demand deposit account 117 held in the check-writer's 100 bank 116. A demand deposit account (DDA) 117 is an account, such as a checking account, whose balance can be drawn upon on demand, for example, without prior notice.

Figure 2:
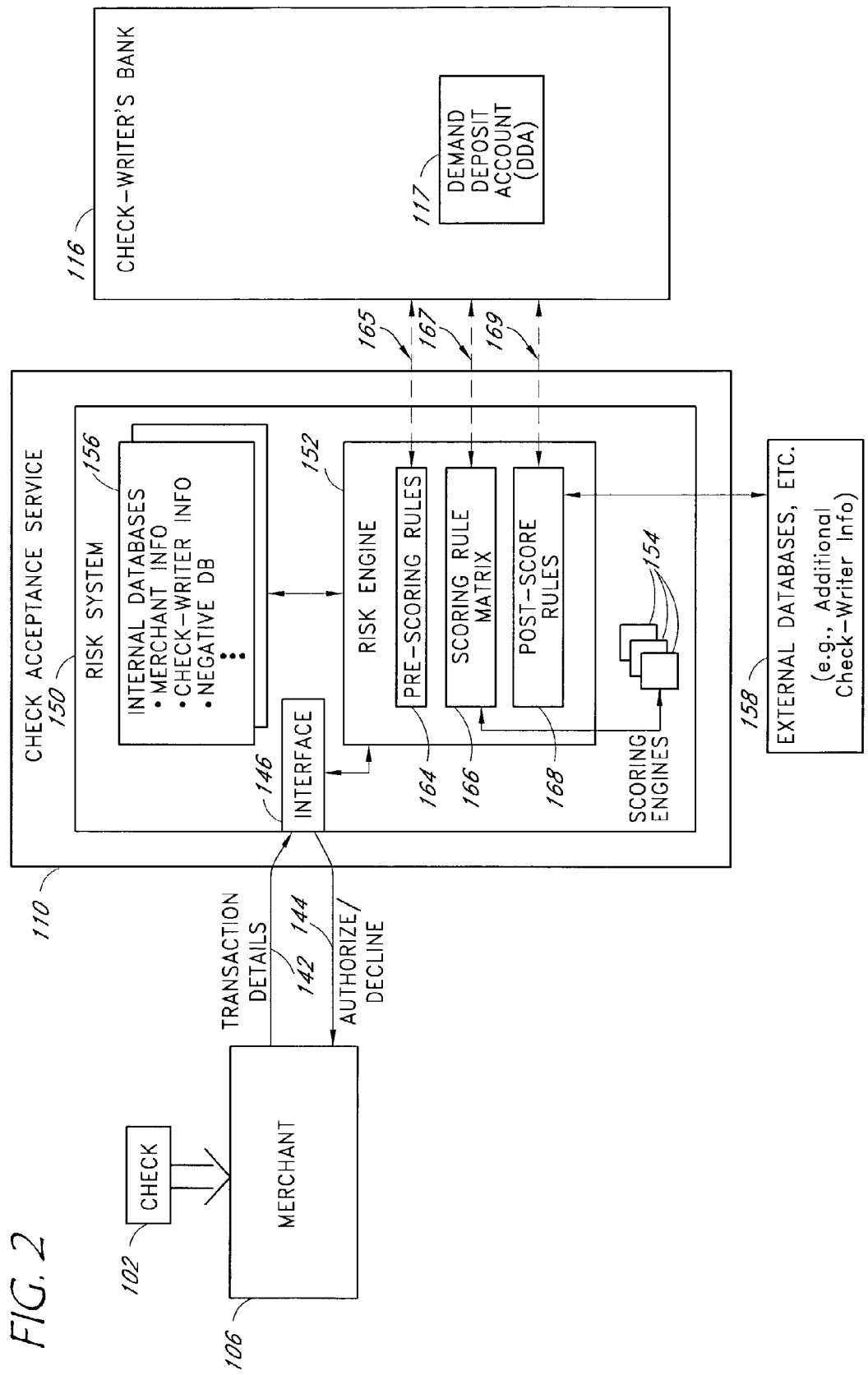
FIG. 2 illustrates one embodiment of a check acceptance service.

It should be understood that while a check 102 as depicted in FIG. 2 may be embodied as a paper check that provides authorization from the check-writer 100 to withdraw funds from a direct deposit account, and as a trigger for an associated risk-assessment process, these functions could also carried out by another promissory payment instrument or system that authorizes payment of funds from a DDA. For example, a fingerprint or other biometric device may be used to initiate payment from a DDA and may trigger the systems and methods described herein. Similarly, a specially configured keychain fob or other scannable device, or voice-actuated system, or cellphone or PDA device configured to authorize DDA payment may also trigger the DDA-associated activity described herein. A check card, debit card, electronic check, smart card, or e-wallet may also be used to authorize payment from a DDA and may trigger the systems and methods described herein. Furthermore, other Internet or telephone payment authorization systems in which a customer's check information is given over the telephone (as, for example, to a mail-order company) or is entered by the customer (as on a merchant website) may also be used to authorize payment from a DDA and may trigger the systems and methods described herein. These and other devices, systems, and/or methods to authorize payment from a customer account may serve the functions carried out by the check 102 in FIG. 2 without departing from the spirit of the invention. Therefore, for the purposes of this disclosure, the term "check" is to be understood to identify an instrument or method used by the holder of a DDA account to authorize withdrawal of funds from the DDA account, and the term "check transaction" is to be understood to identify a transaction that involves a transfer of funds from a DDA that is authorized by a "check."

The check 102 may be accepted and deposited into a merchant's bank 112, as indicated by path 120, without receiving any external authorization. Such a check 102 goes through a clearing process that is well known, wherein the merchant's bank 112 sends the check 102 to a federal clearing house 114 as indicated by path 122. The federal clearinghouse 114, in turn, sends the check 102 to the check-issuing bank' 116, as indicated by path 124. If the check 102 is considered to be valid, the check "clears," and the transaction is completed successfully. The check's amount is debited from the DDA 117 in the check-writer's bank 116 and is then transferred to the merchant's bank 112, as indicated by path 126. The check-writer's bank 116, also known as the issuing bank, can be any financial institution that holds a demand deposit account.

In FIG. 1, any of the merchant 106, the merchant's bank 112, the check acceptance service 110, the federal clearing house 114, the check issuing bank 116, and a third part bank access service 137, which may be used by the check acceptance service 110 to communicate with the issuing bank 116 and which will be described in greater detail below, may comprise computer processors. The computer processors may comprise, by way of example, personal computers (PCs), mainframe computers, other processors, program logic, or other substrate configurations representing data and instructions, which operate as described herein. In other embodiments, the processors may comprise controller circuitry, processor circuitry, processors, general purpose single-chip or multi-chip microprocessors, digital signal processors, embedded microprocessors, microcontrollers and the like.

In many check transactions, the check 102 does not clear for one or more of a variety of reasons, and the merchant's bank account 112 is not credited with the check amount. A sampling of these reasons includes non-sufficient funds (NSF) in the checking account 117, a stop payment request by the check-writer 100, and a fraudulent check 102. When the check 102 does not clear, the merchant 106 is left with the responsibility of collecting the proper funds or the merchandise 104 from the check-writer 100. In many instances, the merchant 106 is unsuccessful in such a collection process, and the already released merchandise 104 is generally written off as a loss. Alternatively, even when the merchant 106 is ultimately successful in collecting the check amount, the merchant's costs associated with the transaction have been significantly increased. To reduce the chance of further loss from the same "bad" check-writer, the check-writer's name may be added to a negative list, which is, in one example, a local database. However, while the local database offers protection against check-writers who have previously bounced checks in the merchant's establishment, this protection is necessarily limited. Check-writers who have not bounced checks in the merchant's establishment, but have a history of bouncing checks or of writing fraudulent checks elsewhere, are unlikely to be detected by such a local database.

As a consequence, many merchants decide to subscribe to and to rely on a check acceptance service 110 to manage risks associated with accepting checks 102 from customers 100. The interaction between the merchant 106 and the check acceptance service 110 is indicated by path 130. The scope of service that the merchant 106 subscribes to may vary, and two exemplary subscriptions are described below.

A first exemplary subscription comprises recommendations provided by the check acceptance service 110 to the merchant 106 regarding whether to accept or to refuse the check 102, based on a risk assessment 111 associated with the transaction. If the check 102 is authorized by the check acceptance service 110 and is accepted, the check 102 then goes through the clearing process via the merchant's bank 112 in a manner similar to that described above. The merchant 106, however, still assumes the risk associated with the transaction if the clearing process is not completed successfully.

A second exemplary subscription comprises the check acceptance service 110 guaranteeing the worthiness of the check 102 based on the risk assessment 111 associated with the transaction. The check 102 goes through the clearing process via the merchant's bank 112 in a manner similar to that described above. If the check 102 does not clear, however, the check acceptance service 110 pays the merchant 106 the amount of the check 102 and assumes the responsibility of collecting from the check-writer 100. A subscription service offering to guarantee the checks that it approves typically charges merchants a higher fee than subscriptions that do not provide a guarantee.

A third exemplary subscription comprises the check acceptance service 110 buying the check 102 outright from the merchant 106, at a price based at least in part on the risk associated with the transaction. In such subscription, when the merchant 106 receives approval from the check acceptance service 110 and accepts the check 102, the check acceptance service 110 agrees to pay the merchant 106 for the check 102. In many cases, the check acceptance service 110 is electronically linked to the merchant's bank 112, as indicated by path 136, to transfer funds.

In the third exemplary subscription, the check acceptance service 110 assumes the responsibility of having the check 102 settled with the issuing bank 116. In some cases, the check 102 is processed as a normal paper check and is sent in paper form to the issuing bank 116 via the federal clearinghouse 114, as indicated by path 132. The check 102 is then sent to the check-issuing bank 116 for settlement, as indicated by the path 124. If the check 102 is valid, funds are transferred from the DDA 117 in the check-issuing bank 116 to the check acceptance service 110 as indicated by path 134, and the transaction is complete. If the check 102 does not clear, the check acceptance service 110 assumes the responsibility of collecting the associated funds, with the possible addition of penalty fees, from the check-writer 100.

In some cases, the paper check 102 received by the merchant 106 from the check-writer 100 is scanned, or otherwise processed, to produce an electronic version of the check, and it is the electronic version that is processed for settlement. The original paper check 102 may be cancelled or otherwise appropriately marked by the merchant 106 and may be returned directly to the check-writer 100 at the point of sale. When the check 102 is processed in electronic form, settlement of the check may take place by direct communication with the issuing bank 116 or via a third party bank access service 137, among other available settlement paths, as will be described in greater detail with reference to FIG. 13 below.

As will be appreciated by one familiar with the art, different subscriptions have different fee schedules that are generally determined by risks associated with the subscriptions. The success of the check acceptance service 110, including profitability, depends at least in part on the acceptance service's 110 ability to accurately assess risks associated with check-related transactions. For example, if the check acceptance service 110 gives incorrect recommendations to a merchant 106 that has the first exemplary subscription described above, the merchant may end up accepting bad checks and/or refusing good checks such that some dissatisfied merchants may discontinue the subscription with the service 110. In situations where the check acceptance service 110 either guarantees or buys the checks 102, such as with the second exemplary subscription described above, profitability for the check acceptance service 110 is directly related to the service's 110 ability to accurately assess the risk of transactions.

It should be noted with respect to the remaining figures of the present application, that although the check acceptance service 110 has been described with reference to FIG. 1 as a service that can assess the predicted risk of a given check transaction, that can recommend for or against acceptance of a check 102 as payment, that can offer to guarantee a given check transaction, that can purchase checks from a merchant, and that can provide settlement service for a check 102 owned by a merchant 106, other embodiments of a check acceptance service 110 may provide one or a subset of the described services.

FIG. 2 is a schematic block diagram of one embodiment of the check acceptance service 110 or agency, illustrating its interaction with the merchant 106 and with the check-writer's bank 116 for assessing the risk associated with a check transaction. In FIG. 2, the merchant 106 receives the check 102 from a customer, and the merchant 106 interacts with the check acceptance service 110 to determine if the check 102 will be accepted or not. The interaction comprises transaction information details 142 submitted by the merchant 106 to the check acceptance service 110 and an authorize/decline decision 144 sent by the check acceptance service 110 to the merchant 106.

The interaction between the merchant 106 and the check acceptance service 110 takes place, in one embodiment, using a communications medium, such as the Internet, which is a global network of computers. In other embodiments, the communications medium can be any communication system including, by way of example, dedicated communication lines, telephone networks, wireless data transmission systems, two-way cable systems, customized computer networks, interactive kiosk networks, automatic teller machine networks, interactive television networks, and the like.

In FIG. 2, the check acceptance service 110 comprises a risk system 150 that evaluates the risk involved with a given transaction and that may be implemented using program logic. In one embodiment, the program logic may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

The risk system 150 comprises an interface 146 for interacting with the merchant 106. The risk system 150 also comprises a risk engine 152 that performs a risk assessment for the transaction, one or more scoring engines 154 that calculate a risk score for the transaction, and one or more internal databases 156 that comprise stored data that may be useful for the risk assessment.

In FIG. 2, the interface 146 receives the transaction information details 142 from the merchant 106 and passes on the information to the risk engine 152. The risk engine 152 evaluates the transaction and returns a decision to the interface 146, which in turn informs the merchant 106 of the authorize/ decline decision 144.

To aid in making its evaluation, the risk engine 152 may access additional information from one or more sources. For example, the risk engine 152 may request additional information about the transaction from the merchant 106 and/or from the check-writer via the interface 146. The risk engine 152 may also access one or more of the internal databases 156 to retrieve stored information about the check-writer, about the merchant 106, and/or other relevant information. For example, some embodiments of a check acceptance service 110 comprise an internal database 156 of information regarding previously accepted "bad" checks," which can be known as a "negative database." Consulting the negative database allows the risk engine 152 to identify check-writers who have a history of writing "bad" checks. Examples of other types of check-writer and merchant information that can be relevant to the risk assessment process are described in greater detail with reference to FIG. 5 below.

The risk engine 152 is further configured to access external databases and other information sources 158 that permit the risk engine 152 to gather information, such as information about the check-writer not available in the internal databases 156, so as to facilitate risk assessment for the current transaction. The risk engine 152 is further configured to access the check-writer's bank 116 in order to request information about the demand deposit account 117 on which the current check 102 is written.

Communication between the check acceptance service 110 and the issuing bank 116, as depicted by paths 165, 167, 169 can take place directly between the check acceptance service 110 and the issuing bank 116, or can take place via one or more intermediary access entities, as depicted in FIG. 3, FIG. 5B, FIG. 6, and FIG. 13 below.

Furthermore, in one embodiment, the communication depicted by paths 165, 167, 169, can take place using a communications medium, such as the Internet, which is a global network of computers. In other embodiments, the communications medium can be any communication system including, by way of example, dedicated communication lines, telephone networks, wireless data transmission systems, two-way cable systems, customized computer networks, interactive kiosk networks, automatic teller machine networks, interactive television networks, and the like.

As shown in FIG. 2, one embodiment of the risk engine 152 comprises a set of pre-scoring rules 164 that make an initial determination to guide further risk evaluation, if any, that needs to performed by the risk engine 152. The pre-scoring rules component 164 may access one or more of the internal databases 156, if necessary, in order to access relevant data. The pre-scoring rules component 164 may also access DDA information from the check-writer's bank 116, as depicted by path 165, and as will be described in greater detail with reference to FIG. 5B. Alternatively, the pre-scoring rules 164 component of the risk engine 152 may decide not to access DDA information, and thus to be spared of the time and expense of such an access operation. For example, based on a determination that the current transaction fits a pattern of frequently good and trouble-free transactions, the pre-scoring rules 164 component may decide not to undertake access to DDA information. Thus, in one embodiment, the pre-scoring rules 164 may be configured to identify check transactions that do not require DDA access, and to initiate DDA access for transactions that are questionable, and that would benefit from the inclusion of DDA information.

Once the pre-scoring rules 164 component has received DDA information that it has requested, the pre-scoring rules 164 component can use the DDA information in conjunction with other available information about the transaction. In some embodiments, access to DDA information that is invoked by the pre-scoring rules 164 may allow the risk system 150 to make an authorize/decline decision 144 without a need for further risk assessment activities. For example, a pre-scoring rule may dictate that if the DDA in question is cited frequently in a negative database 156 of "problem" check-writers, then information received from the DDA will be used exclusively to make an authorize/decline decision 144. In another situation, a pre-scoring rule or set of rules may dictate that because of the type of merchant 106 that is requesting authorization, and because of the amount of the check 102, that a more complex set of factors will be considered in conjunction with one another in order to determine how to guide further risk assessment and decision-making operations.

The risk engine 152 further comprises a matrix of scoring rules 166 configured to calculate and return a risk score indicative of the probable risk of a transaction. The scoring rule matrix 166 selects an appropriate scoring engine 154 for the check transaction situation at hand. Individual scoring engines 154 rely on different subsets of information about the check transactions and process the information in various ways. The individual scoring engines 154 of the set are tailored to address at least one of a plurality of specific transaction situations so as to enhance accuracy in determining the risk score.

A given scoring engine 154 may utilize information about the DDA 117 associated with a transaction in order to calculate a risk score, and, if DDA information has not been previously requested by the pre-scoring rules component 164, the scoring rule matrix 166 can initiate access to the needed information, as depicted by path 167. Based on the risk score calculated by the scoring engine 154, the scoring rule matrix 166 determines whether the transaction should be authorized, declined, or further evaluated. One example of a decision process in which DDA information is integrated with other risk assessment information to generate a risk score is described in greater detail with reference to FIG. 11 below. In one embodiment, pre-determined cut-off points divide scores that indicate authorization from scores that indicate a need for further evaluation or a recommendation to decline accepting the check.

The transaction may then be analyzed by a post-score rules component 168 of the risk engine 152, which, based in part on the risk score, provides additional evaluation that may be especially useful in cases with borderline risk scores. The post-score rules component 168 may access external databases 158 or other information sources, if necessary, to complete the post-score evaluation, especially to double-check decisions based on risk scores that fall within a predetermined range about a cut-off point. The post-score rules component 168 may also access DDA information from the issuing bank 116 or other sources, as depicted by path 169 and as described in greater detail with reference to FIG. 5B, if DDA information is desired for further evaluation of the transaction and has not yet been accessed. In some embodiments, DDA information received by the post-score rules component 168 can allow the component 168 to overturn an accept/decline recommendation made by the scoring rule matrix 167 component. In some embodiments, based on DDA information received, the post-score rules component 168 causes the checking transaction to be re-scored using another scoring engine 154 before a final authorize/decline decision is made.

It is to be understood that other configurations of systems that are able to selectively access account information to enhance risk assessment are possible without departing from the spirit of the invention described herein. For example, other information associated with the DDA 117 may be available for access, either directly or indirectly, by the check acceptance service 110 and may advantageously be used to enhance risk assessment, risk categorization, and/or check authorization. As one example, in one embodiment, information is accessible to the check acceptance service 110 regarding savings accounts or other sources of funds that are linked to the DDA 117 and that are available for over-draft protection for the DDA 117. Thus, for the purposes of this disclosure, the term "DDA information" or "DDA status information" may correctly comprise any information that allows for an enhanced assessment of the risk involved in agreeing to participate in a DDA transaction.

Selective Access to DDA Information

The mere ability to access DDA information, also known as DDA status information, does not dictate that expending the resources to access DDA information will always result in a higher degree of predictive accuracy. Although DDA status information can provide input that is highly relevant to the risk-assessment associated with a given transaction and that is not easily duplicable by other means, in-depth risk-assessment is not a requirement for a large number of check transactions and assessing these transactions is not significantly enhanced by access to DDA information. The ability to distinguish between check transaction risk assessments that do benefit from access to DDA information and those that do not is therefore valuable to a check acceptance service. This is especially true from a point of view of cost- and time-effectiveness and when keeping in mind that risk assessment for check transactions such as those described herein is typically undertaken while a customer is waiting at a point of sale.

Figure 3:
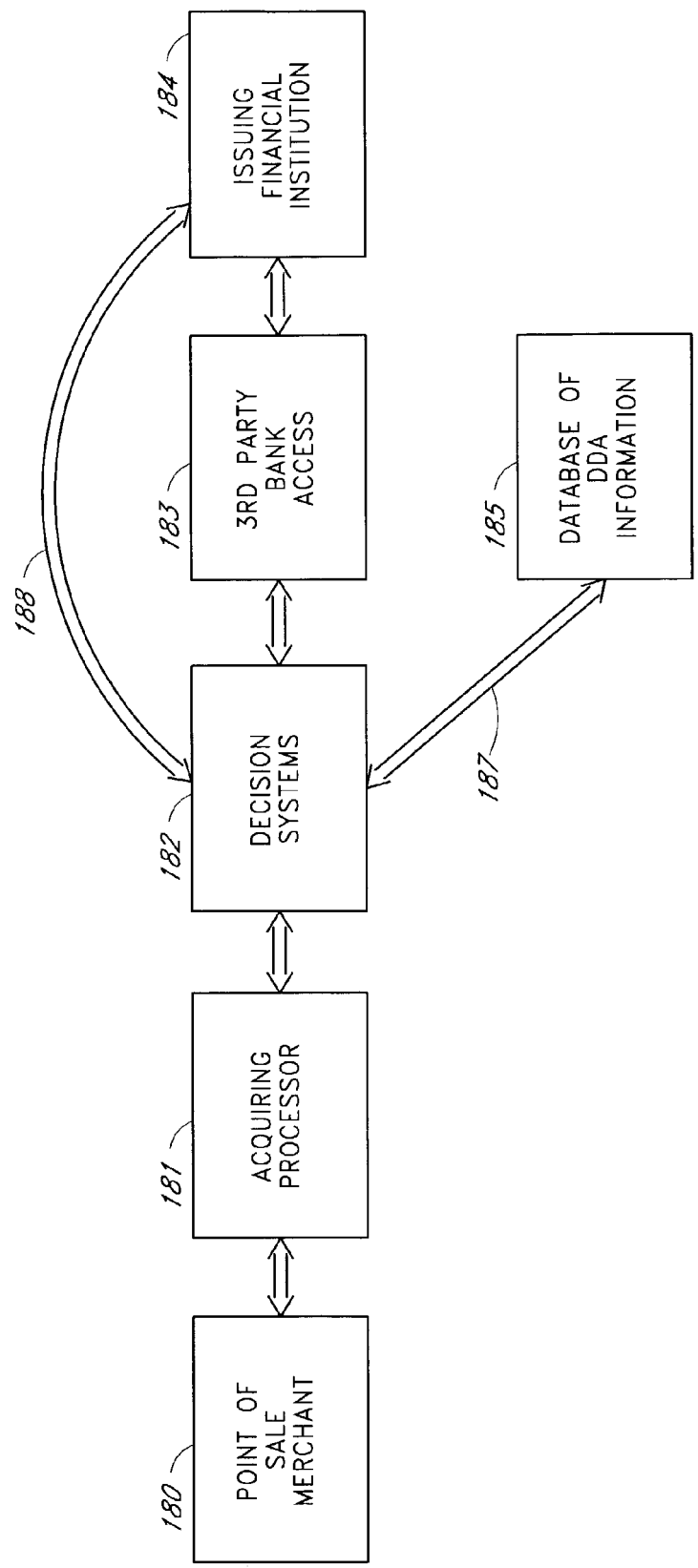
FIG. 3 is a diagram depicting one embodiment of selectively accessing DDA information.

FIG. 3 depicts one embodiment of a chain of entities 180-185 that can cooperate to allow access to sources of DDA status information when making a check accept/decline decision for a proposed check transaction. In the embodiment shown, a point-of-sale merchant 180 receives a check and contacts an acquiring processor 181 who has contracted to provide check acceptance decisions for the merchant 180. The acquiring processor 181 receives transaction details from the merchant 180, which are then transmitted to the acquiring processor's 181 decision systems 182. The decision systems 182 guide the remainder of the decision-making process based at least in part on the transaction details received.

If the decision systems 182 determine that DDA status information is desired for enhanced decision-making with respect to the current check transaction, the decision systems 182 may optionally transmit a DDA status information request to an online third party access service 183 or other source of DDA information that is able to provide access to the issuing financial institution 184. The online third party bank access service 183 passes along a corresponding request for DDA status information to the issuing bank 184, and the issuing bank 184 provides a response to the third party bank access service 183, which in turn transmits the DDA status information back to the decision systems 182 for processing. The decision systems 182 return their determination regarding the check in question, which is based at least in part on the received DDA information, to the acquiring processor 181 who, in turn, provides a check acceptance decision to the point-of-sale merchant 180.

Alternatively, as shown in FIG. 3, the decision systems 182 may have access to direct communications 188 with the issuing financial institution 184, in which case there may be no need to use the services of the third party bank access 183.

In some embodiments, another available source of DDA information is a DDA information database (or repository or other type of data storage facility) 185 that is external to the issuing financial institution 184. For example, a dedicated service may obtain DDA information from one or more issuing financial institutions and may provide access to the DDA information for a fee. As another example, the acquiring processor 181 may maintain a similar database of DDA information that is updated periodically based on information received from the one or more issuing financial institutions. In some embodiments an issuing financial institution may provide DDA information to such a database 185 in exchange for a periodically paid fee, such as a monthly or yearly fee. In some embodiments an issuing financial institution may provide DDA information to such a database 185 in exchange for a fee that is charged on a per-access basis.

In some embodiments, accessing DDA information from an external database 185 may cost less than either direct access 188 to the issuing financial institution 184 or access via an online third party access service 183. However, the information stored in DDA information databases 185 may not be as up-to-date as the other aforementioned sources. For example, a DDA information database 185 may be updated daily and may thus have information that was accurate as of the previous business day. Embodiments that can selectively access DDA information using DDA information databases 185 can determine if the information from such databases 185 meets the needs (for example, for timeliness, accuracy, and cost) of the check transaction assessment at hand.

The three sources, or paths 183, 187, 188 available for access to DDA information depicted in FIG. 3 are associated with different resource costs and benefits for the acquiring processor 181. For example, as described above, use of the different paths 183,187,188 may require payment of different fees. Also, not every path 183,187,188 will necessarily provide access to DDA information from every issuing financial institution 184. Therefore, the different paths 183, 187, 188 may offer DDA information for differing sets of issuing financial institutions 184. Different paths 183, 187, 188 may also access DDA information using differing types of communication media, such as access via the Internet, access via dedicated communication line, access via internal database, and the like. Thus, use of the different paths 183, 187, 188 may be associated with differing resource requirements and/or may offer access to the DDA information at differing speeds. Furthermore, use of different paths 183, 187, 188 may be associated with different levels of complementary service, each of which may be associated with the payment of a different fee. For example, one path may offer access to DDA information that is more up-to-date and/or complete than that offered by another path. One path may provide an option for the acquiring processor 181 to request that the issuing financial institution 184 place a hold on the amount of funds authorized by the check. One path may provide an option for the acquiring processor 181 to request that the issuing financial institution 184 immediately cash, or settle, the check. These and/or other differences amongst the available paths 183, 187, 188 available for accessing DDA information make intelligent selection of an access path suited to the needs of the acquiring processor 181 for the given check transaction desirable.

Another alternative depicted in FIG. 3 is the scenario in which the decision systems 182 determine that an authorize/decline decision can be made without reference to the DDA information, in which case the decision systems 182 can respond directly to the acquiring processor 181. Thus, costs in time, money, processing power, bandwidth, or other resources that may be used for communicating with the third party bank access service 183, the issuing financial institution 184, or the third party databases 185 can be avoided.

In one embodiment, a request for DDA information comprises information that enables identification of a given DDA and information regarding the dollar (or other currency) amount of the proposed transaction.

FIG. 4 presents a table 190 that provides one embodiment of a set of DDA status response codes, along with their interpretations, that can be received from an issuing bank in response to a request for DDA status information. In the embodiment shown in FIG. 4, status code NFD 191 is returned by the bank when the account for which DDA information was requested does not exist. Such a situation could indicate, for example, that the account number was read or entered incorrectly when the DDA information request was sent. Alternatively, an NFD 191 response could indicate a potentially fraudulent check. Status code NDD 192 indicates that the account exists, but that it is not a DDA account and is not available for DDA-type withdrawals. Receiving a status code NDD 192 may also provide an indication of a potentially high-risk transaction. Status codes VAL 193, NSF 194, and NFZ 195 indicate that the account in question is a valid, open account. However, status code VAL 193 indicates that the DDA currently holds sufficient funds to cover the amount of the current transaction, while status code NSF 194 indicates that sufficient funds for the requested transaction do not exist in the DDA, and status code NFZ 195 indicates that the DDA is currently overdrawn. In other embodiments, the status code table 190 comprises codes that indicate the status of the DDA, such as, for example, whether the account is open, closed, or the like, but do not provide information as to the sufficiency of funds within the DDA for the current requested transaction.

Thus, in the embodiment shown in FIG. 4, the account status and the sufficiency of funds information are reported using a combined status/sufficiency code. In other embodiments, other combinations of information referring to DDA status and balance may be accessed and utilized by the systems and methods described herein. Information about the DDA may be communicated using two or more fields, for example, one to report on the current account status and one to compare the amount of the current check transaction with the amount currently in the DDA. In some embodiments, other DDA information provided by the issuing bank may also be of use and may be incorporated into a risk-assessment process that makes use of DDA information.

Figure 5A:
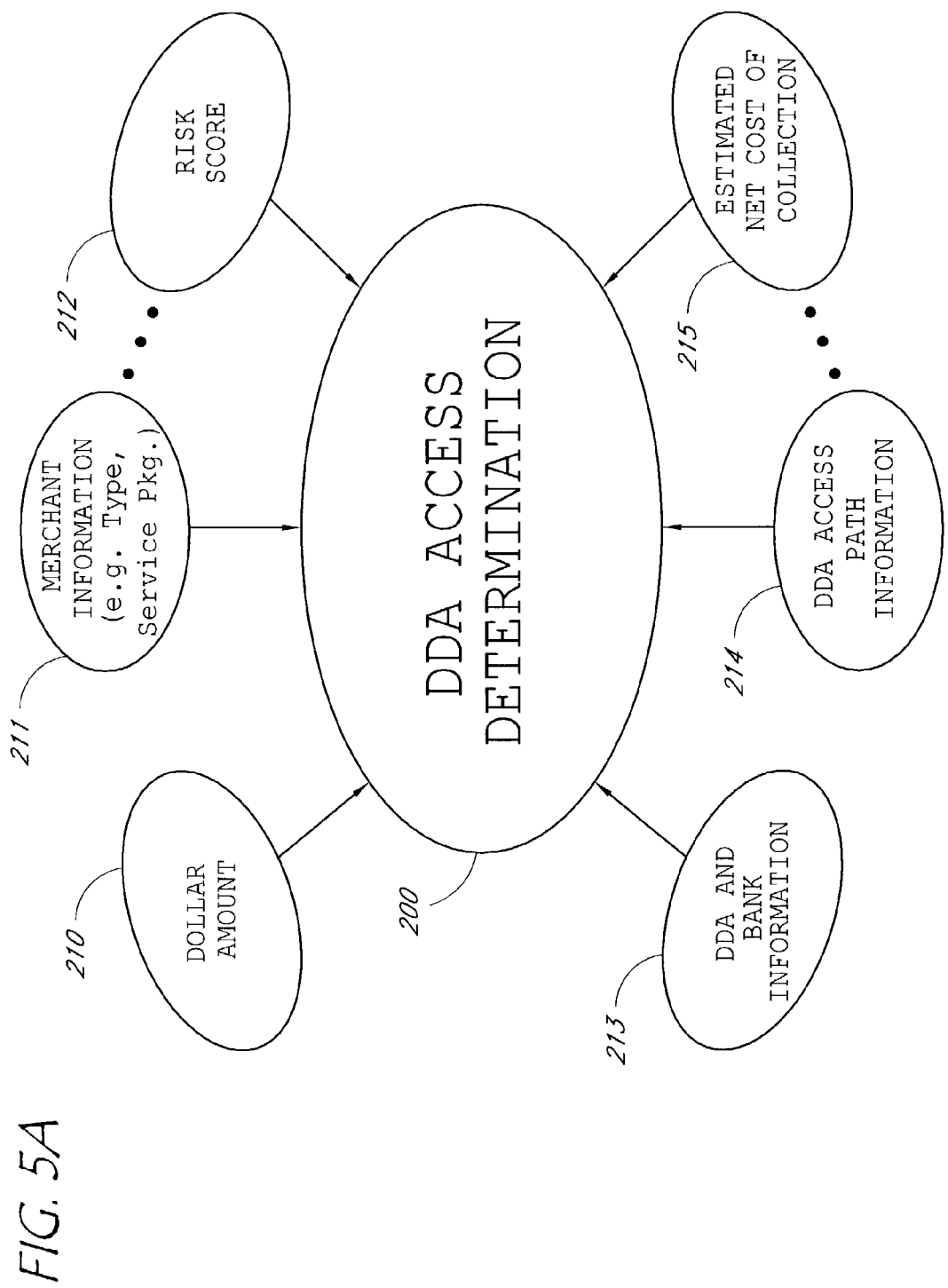
FIG. 5A depicts exemplary factors that influence DDA access determination.

FIG. 5A depicts some examples of the types of information 210-215 that can be used as decision factors by one embodiment of a DDA access determination 200 that determines whether access to DDA information is desired. With respect to the embodiment of the risk system 150 shown in FIG. 2, the DDA access determination 200 may be undertaken by the pre-scoring rules component 164, by the scoring rule matrix component 166, or by the post-score rules component 168 of the check acceptance service's 110 risk engine 152. In other embodiments, the DDA access determination 200 may be incorporated into other forms of risk assessment or decision-making processes.

Some of the decision factors, or variables, depicted in FIG. 5A may be extracted from the transaction details received from the merchant. For example, a check dollar amount 210, bank identification information 213, which comprises an account number and bank's routing number, and merchant identification information 211 are variables whose values can typically be determined from transaction details that may be received from the merchant or from a variety of databases.

With the information provided in the transaction details, the DDA access determination process 200 can locate additional available information that may be relevant and useful. For example, access to the DDA account number 213 allows for reference to an internal "negative database," if one exists, to see if the DDA or a customer associated with the DDA has a promissory payment history of bad transactions or of good transactions. As another example, access to the issuing bank's routing number 213 allows the process 200 to determine if this is a bank from which DDA information is available, either by direct access, by a third party access service, from a database service, or by some other means.

Access to merchant identification information 211 allows the process 200 to reference additional information regarding the type of service agreement, or subscription, that the merchant 106 has contracted to receive from the check acceptance service 110, such as, for example, a contracted accept-able level of risk or a level of guarantee desired. Other relevant information associated with a merchant service agreement comprises circumstances under which the merchant desires that DDA status information will be accessed. For example, a merchant may stipulate, amongst other stipulations, that for promissory payments exceeding $200 in value, including DDA information in risk assessment determination is preferred. In some embodiments, merchants may also indicate preferences regarding available sources of DDA information that affect DDA access determinations.

Merchant identification information 211 also allows the process 200 to classify the merchant by merchant type category (e.g., jewelry store, pawnshop, gas station, Internet mail order merchant) or by other classification method, which, in some embodiments, is used as assessment variable. In some embodiments, merchant type categorization takes advantage of statistical analysis that can reveal customer purchase patterns, promissory payment risk patterns, and payment history patterns shared by merchants in a given merchant category and that allow for enhanced risk prediction when merchant category information is included in a risk analysis.

Additional variable values may be calculated or looked up based on the transaction information details. For example, once the issuing bank has been identified by routing number 213, the available access paths for accessing the DDA information from the issuing bank, as well as the cost of utilizing each available path 214, and the currentness of data provided by each path can be looked up in an appropriate table or other storage structure. In some embodiments, a risk score 212, risk category, or other assessment of the anticipated level of risk, based on the transaction details and on other stored information, can be calculated and used in the determination 200 as to whether to request access to DDA information.

In cases where the check acceptance service 110 has contracted to guarantee or to purchase the check outright and to assume responsibility for collecting on the debt, an estimated net cost of collection 215 can be calculated and used as a variable in the DDA access determination process 200. The estimated net cost of collection 215 or financial gain, sometimes known by the term "collectability," can take into account, for example, the check amount, any predicted additional late fees to be paid by the check-writer, and a likelihood of getting paid. For example, the check acceptance service 110 may have access to payment history records that indicate that a check-writer in question has a history of writing checks for which sufficient funds do not exist in the DDA. If the check acceptance service is able to determine that the check-writer also has a history of eventually paying for all checks, along with all associated penalty fees, and without any need for the check acceptance service 110 to expend undue effort, then the check acceptance service 110 may decide to recommend acceptance of the check, even if it is for a fairly high dollar amount. The check acceptance service may be configured to make this decision, based on the variables for the given check transaction, without expending resources to access the DDA information. In another case, a relatively low-dollar-amount check that is determined to be high-risk and for which little collectability financial gain information is available, may trigger a decision to expend the resources necessary to access DDA information. Thus, the system can implement an evaluating decision process before expending the resources to access DDA information, rather than indiscriminately always or never accessing DDA information.

The above descriptions of sample variables that can influence the DDA access determination process 200 are intended to be illustrative and not restrictive. In embodiments other than that shown in FIG. 5A, some, all, or none of the variables depicted, along with other optional variables, factors, and methods, may be used in order to best determine whether to request access to DDA information. In addition, the DDA access determination 200 may make use of any of a wide variety of forms suitable for decision-making, such as a decision tree, an expert system, or other ruled-based decision system, as a linear calculation or other scoring mechanism, or as a form of probabilistic or neural network, genetic, or other algorithm for decision-making.

For example, in one embodiment of the risk system 150, merchants are assigned a Standard Industry Code (SIC) that is descriptive of the business type and that is considered to be predictive of customer purchase patterns and of the level of risk involved in accepting promissory payments of various amounts. Table 1 is a simplified version of a look-up table that correlates the SIC code with a check amount limit that is considered to be a maximum safe amount for processing without need to access DDA information.

Based on the information in Table 1, if an incoming check is drawn on a financial institution for which DDA access is available, and if the amount of the check is over the limit that corresponds to the appropriate SIC, then DDA information is requested, and otherwise it is not. For example, if a check for $75.00 is received by a merchant whose SIC is "5531," DDA information is not requested, even if access to DDA information for the given check is available. If a merchant receives a check of $500.00 whose SIC is "5944," and if access to the associated DDA information is available, then DDA information is requested. If a check of $300.00 is received by a merchant whose SIC is "5734," and if no avenue for accessing information about the associated DDA is available from the issuing bank, then DDA information cannot be requested, even though it might be desired.

TABLE 1

SIC Look-up Table

| SIC | Check Amount Limit |
|---|---|
| 5531 | $100 |
| 5611 | $500 |
| 5944 | $300 |
| 5734 | $250 |
| 5731 | $150 |
| 7514 | $200 |

Figure 5B:
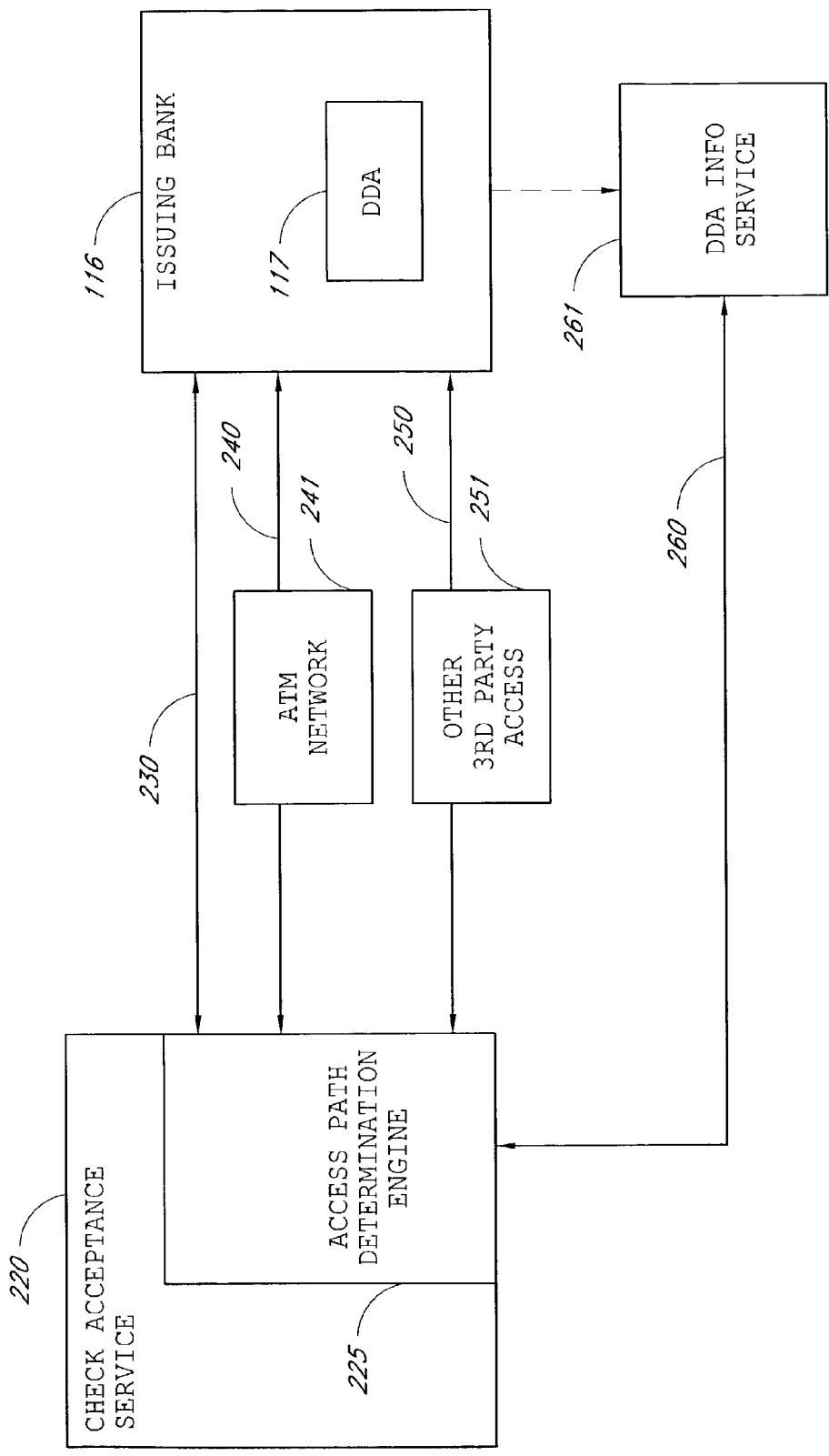
FIG. 5B is a diagram depicting one embodiment of selective determination of an access path for requesting DDA information.

FIG. 5B shows one embodiment of a check acceptance service 220 that has access to DDA information via more than one avenue or path. Three of the paths 230, 240, 250 shown in FIG. 5B access the issuing bank 116 directly for information about the DDA 117 associated with a given check transaction. The check acceptance service 220 may have an agreement with the issuing bank 116 that allows it to access the issuing bank 116 directly for DDA information requests, as shown by path 230 in FIG. 5B. In some embodiments, the check acceptance service 220 may be able to send a DDA information request to the issuing bank 116 via an ATM network 241 that has direct access to the issuing bank 116, such as the Star, Pulse, or NYCE networks. In some embodiments, the check acceptance service 220 may be able to send a DDA information request to the issuing bank 116 via another type of third party access entity 251. Using the access paths 230, 240, 250 may require payment of a fee by the check acceptance service 220 or may be part of a more comprehensive financial arrangement in which the check acceptance service 220 participates.

In some embodiments, and for some issuing banks, a DDA information access path 260 that takes advantage of a DDA information service 261 may be available to the check acceptance service 220. In one embodiment, a DDA information service 261 receives information about the DDAs 117 at one or more issuing banks 116, and makes that DDA information available to others, typically in return for a fee.

When the check acceptance service 110 has access to DDA information from more than one avenue or access path, the individual access paths, as exemplified by paths 230, 240, 250, 260 in FIG. 5B, have associated sets of advantages and disadvantages, costs and benefits. For example, entities that serve as "avenues" 241, 251 or sources 116, 261 for accessing DDA information can have varying price structures for their services and can offer a variety of access options. Furthermore, such services can provide access to DDA information from a subset of all possible banks (sometimes referred to as their "coverage") and can provide access to DDA information of varying degrees of accuracy and currentness. For example, one service provides access to DDA information in the form of a database of DDA information from the previous day. Another service provides fast and accurate information by directly contacting issuing banks 116 online at the time of a DDA information request, and also provides a variety of accompanying service options, but is limited in the number of banks to which it provides access. Other services that provide access to DDA information for a wider selection of banks may be expensive.

In check acceptance services 220 with a variety of available DDA access paths 230, 240, 250, 260, once a determination 200 has been made to access DDA information, a subsequent decision may be the determination of which of the available paths to use for accessing the DDA information. Thus, for example, rather than always using a given access path, or rather than having one preferred path with a standard alternative path, the full variety of available paths, with their variety of advantages and disadvantages, can be balanced and exploited to best suit the needs of a given check transaction risk assessment.

Accordingly, as shown in FIG. 5B, the check acceptance service 220 can comprise an access path determination engine 225 to determine an expedient access path for the information request associated with a given transaction. The access path determination engine 225 can consider factors comprising, for example, but not limited to, dollar amount of the check, issuing bank for the check, information about the merchant requesting authorization, risk score, if any, that has been calculated for the transaction, and information about the various paths available for accessing the desired information. Information about the various access paths available may comprise information about the cost of using a given access path, the speed and reliability of using a given access path, and levels and types of service offered with a given access path.

The access path determination engine 225 is implemented using program logic. In one embodiment, the program logic may advantageously be implemented as one or more modules that may be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

In risk assessment systems that make use of a calculated risk score, the access path determination engine 225 can be invoked before a risk score has been calculated for a check transaction, or during or after calculation of a risk score, as will be described in greater detail with respect to FIG. 7 below.

Selective Use of DDA Information

Once DDA information has been accessed, the information can be used in a variety of ways by the risk system in order to help generate an authorize/decline decision 144 for the merchant 106. One method of using DDA information in association with risk assessment for a check transaction is to accept a check if the DDA information indicates that the account is open, valid, and in possession of sufficient funds to cover the check, and to decline the check otherwise. This simple method makes the assumption that basing an accept/decline decision 144 on currently available DDA information will minimize exposure to risk on the part of the merchant 106 or other check-holder. However, as mentioned above, this type of strategy may not serve the long-term interests of the merchant 106 or of the check acceptance service 110. By ignoring other relevant information available to the risk system 150, the check acceptance service 110 may recommend declining a check that is actually good (an action that can lose a sale for the merchant and that can engender negative feelings towards the merchant on the part of the rejected customer). Ignoring other risk-assessment information can also lead to accepting a check that appears to be good, but that further investigation might reveal is associated with a high level of risk. Such a situation could arise, for example, with a check-writer who currently has sufficient funds, but who has a history of periodically writing checks that far exceed the DDA funds and of later refusing to pay until after protracted efforts have been expended by a collection agency. Thus, integrating DDA information with other available risk assessment information can lead to an accept/decline decision 144 of increased accuracy.

Figure 6:
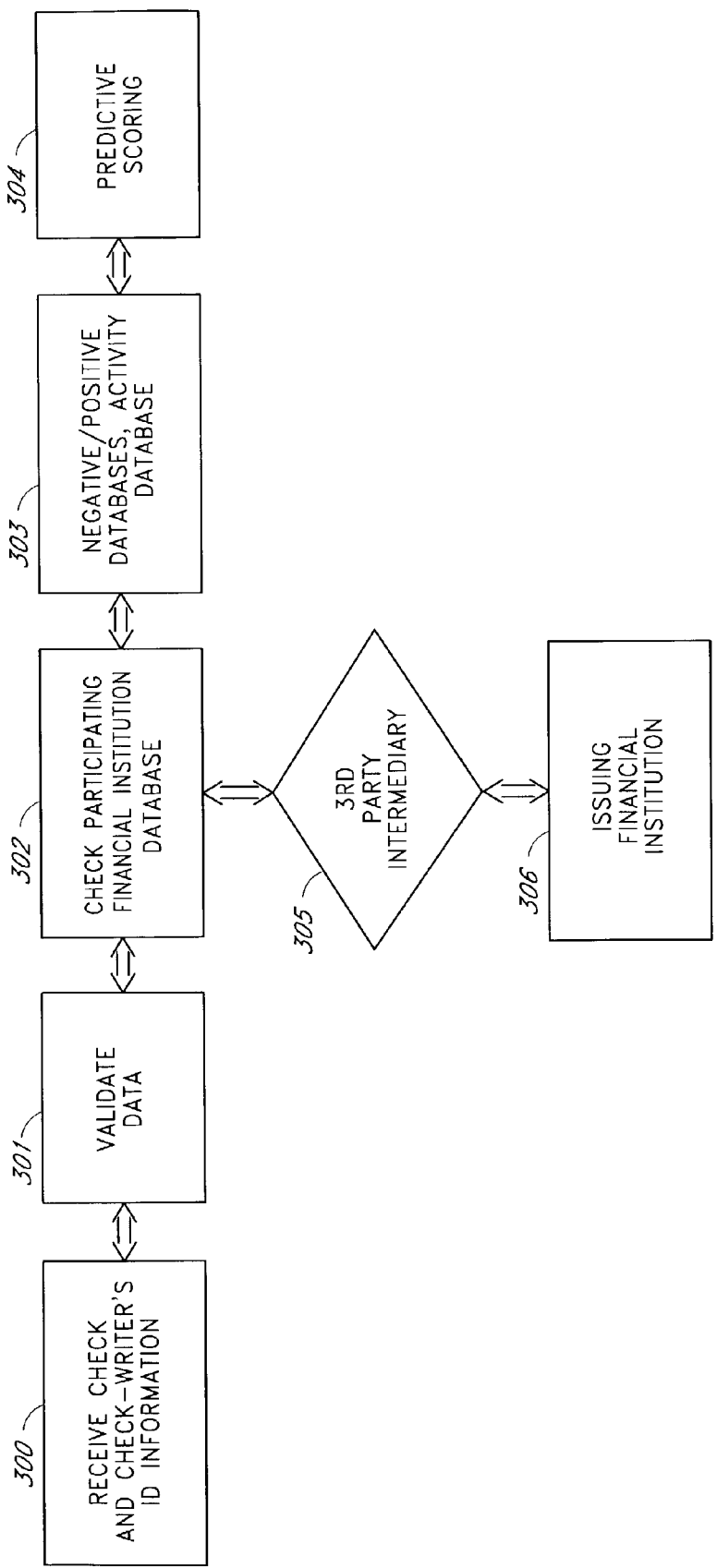
FIG. 6 is a diagram illustrating one embodiment of selective use of DDA information.

FIG. 6 depicts one embodiment of a chain of actions and entities 300-306 in which DDA information received from a check-writer's issuing financial institution 306 is integrated with, and possibly overridden by, the remainder of the risk assessment factors. In the embodiment shown, the first step 300 takes place when the check acceptance service 110 receives transaction details, comprising information about a check and a check-writer, as part of a check authorization request. In step 301, the received data is validated, and in step 302, a decision is made to request DDA information from the issuing financial institution 306. In the embodiment shown in FIG. 6, the check acceptance service 110 is able to access information from the issuing financial institution 306 by using the services of a third party intermediary 305 to accomplish the access. The DDA information is transmitted by the issuing financial institution 306 to the check acceptance service 110 via the third party intermediary source 305. The check acceptance service 110 then integrates the DDA information with information from other databases, for example, negative and/or positive activity databases 303, in order to accomplish a final predictive scoring 304 that enables an accept/decline recommendation to be sent to the merchant 106.

Figure 7:
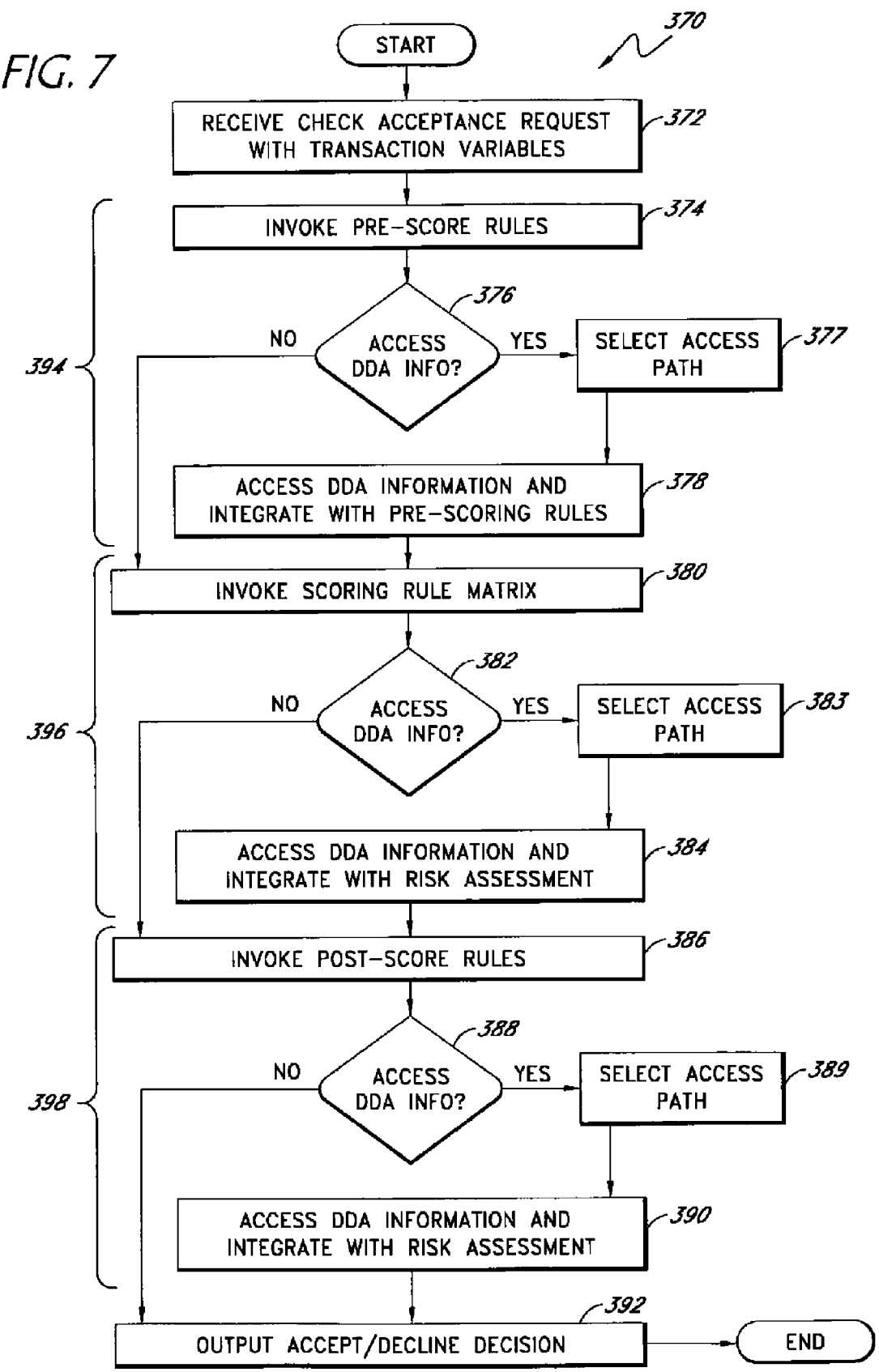
FIG. 7 is a flow chart depicting one embodiment of the integration of DDA access determination with the overall risk assessment of a check transaction.

FIG. 7 is a flow chart that illustrates one embodiment of a risk assessment process 370 that comprises decisions, at various junctures, to access DDA information (or not), as will be described below. The risk assessment process 370 depicted in FIG. 7 is one that can incorporate a risk score calculation. As will be described with reference to FIG. 7, in this embodiment, decisions about whether to access DDA information and about which path to use for DDA access may be incorporated into the risk assessment process 370 before any risk score is calculated or as a factor in a risk score calculation or in conjunction with use of a risk score. In other embodiments, as has been described above, decisions about whether to access DDA information and about which path to use for DDA access may be incorporated into risk assessment processes that do not involve the calculation or use of a risk score.

The risk assessment process 370 is implemented using program logic. In one embodiment, the program logic may advantageously be implemented as one or more modules that may be configured to execute on one or more processors. The modules may comprise, but are not limited to, any of the following: software or hardware components such as software object-oriented software components, class components, components and task components, processes methods, functions, attributes, procedures, subroutines, segments of program code, drivers, firmware, microcode, circuitry, data, databases, data structures, tables, arrays, or variables.

The risk assessment process 370 in FIG. 7 begins in step 372 when the risk system 150 receives a check acceptance request, with associated transaction details, from an entity, such as, for example, the merchant 106, who is requesting risk assessment. Moving on to step 374, the process 370 invokes pre-scoring rules 164 that can carry out preliminary evaluation of the check transaction. The process 370 moves to step 376, where a decision is made in accordance with the pre-scoring rules 164 whether to request access to DDA information. The decision of step 376 can be made based on information associated with the current check transaction, as has been described with respect to FIG. 5. One embodiment of a method to use the information in order to make a decision, such as the decision of step 376, will be described in greater detail with reference to FIG. 11 to follow.

If a decision is made at step 376 to access to DDA information, the process 370 moves on to step 377 where the risk system 150 invokes the access path determination engine 225 in order to select an expedient DDA access path. In one embodiment, the access path determination engine 225 may take into consideration rules that apply to transactions in general as well as rules that apply specifically to transactions from the given merchant and that are based on a service contract entered into with the merchant.

In one embodiment, the risk system 150 sends information to the access path determination engine 225 that may limit the set of access paths available for the given transaction. For example, in one embodiment, an agreement made between the merchant and the check acceptance service may stipulate that if a given transaction is initiated over the Internet, which can be an indicator of a higher-risk transaction, and if the dollar value of the transaction is high, for example $1000, then the access path determination engine 225 may be limited to selection amongst available access paths that offer a guarantee service. In one embodiment, the access path determination engine 225 selects an access path amongst the available access paths that meets any limitations imposed for the given transaction and that costs the least to utilize. In other embodiments, the access path determination engine 225 selects an access path amongst the available access paths that meets any limitations imposed for the given transaction and that offers other advantageous features.

The process 370 next moves on to step 378, where the DDA information is requested and integrated with the pre-scoring rules 164, before moving on to step 380. As will be appreciated by one of ordinary skill in the art, DDA information can be integrated with pre-score rules to carry out any one of a wide variety of initial risk assessment implementations. Similarly, based on the characteristics and parameters associated with the transaction in question, initial risk assessment by the pre-scoring rules 164 component may consider a wide variety of risk factors, comprising at least one of, but not limited to: information about the promissory payment and transaction, information about the merchant category and service agreement, information about the customer payment history and stored information, information about predicted financial gain and collectability.

In one embodiment, DDA information is integrated with the pre-scoring rules 164 as a system that categorizes the risk level of the transaction as being of an acceptable level, of an unacceptable level, or of a borderline level. In some embodiments, the process 370 may terminate at any stage at which an risk assessment has been conclusively achieved, and it is possible that an initial risk assessment in the pre-scoring rules component 164 of the risk system 150 will be considered conclusive if it produces an indication of an acceptable (indicating an early recommendation to accept the payment) or an unacceptable risk level (indicating an early recommendation not to accept the payment). In such a situation, risk assessment may be terminated at this point without the calculation of a risk score, and an indication of the assessment can be sent to the merchant. In the same embodiments, it is possible that if the integration of DDA information with the pre-scoring rules component 164 of the risk system 150, produces an indication of a borderline risk level, then risk assessment continues on to the scoring matrix component 166 for more comprehensive evaluation.

In other embodiments, risk assessment continues through all three components of the risk system before being considered conclusive.

If at step 376, the process 370 decides not to access DDA information at this time, the process 370 moves directly on to step 380, where the scoring rule matrix 166 is invoked in order to generate a risk score for the check transaction. Moving on to step 382, the process 370 determines whether access to DDA information is desired as part of a risk scoring procedure.

If the decision of step 382 is to access DDA information, the process 370 moves on to step 383 where the risk system 150 invokes the access path determination engine 225 in order to select an expedient DDA access path. The process 370 next moves on to step 384, where the DDA information is requested and integrated with the scoring rule matrix 166, before moving on to step 386.

In step 382, a decision may be made not to access DDA information. Such a decision may be based on the fact that DDA information has already been obtained. Alternatively, a decision not to access DDA information may be based on a cost/benefit assessment that determines that accessing DDA information is not expedient at this time, or on an assessment that DDA information for the given transaction is not available. A decision not to access DDA information may also be made for other reasons. If the decision of step 382 is to refrain from accessing DDA information, the process 370 calculates a risk score or comprehensive risk evaluation using a combination of risk factor variables. The method of calculating the risk score may be dictated by the scoring engine assigned to the risk assessment. In one embodiment, the calculated risk score is associated with an expression of acceptable risk, unacceptable risk, or borderline risk, and moves directly on to step 386, where post-score rules 168 are invoked in order to perform any refinement necessary to the risk evaluation and to consider circumstances that may mitigate a borderline risk score. In one embodiment, risk scoring comprises, at least in part, a consideration of a predicted likelihood of successfully settling the promissory payment and a predicted measure of financial gain from accepting the promissory payment. Moving on to step 388, the process 370 once again determines whether access to DDA information is desired at this juncture.

If the decision of step 388 is to access DDA information, the process 370 moves on to step 389 where the risk system 150 invokes the access path determination engine 225 in order to select an expedient DDA access path. The process 370 next moves on to step 390, where the DDA information is requested and integrated with the post-score rules 168, before moving on to step 392.

If the decision of step 388 is to refrain from accessing DDA information at this time, the process 370 moves directly on to step 392, where a final accept/decline decision or recommendation is formulated and is transmitted to the merchant or other requesting entity.

The decision steps 376, 382, and 388 are individual embodiments of the DDA access determination process 200 that was described with reference to FIG. 5. The decision steps 376, 382, and 388 may rely on different subsets of the variables and may combine the variables in differing ways.

The steps of the process 370 depicted in FIG. 7 may be modified and/or re-arranged in a variety of ways, without departing from the spirit of the invention. More detailed descriptions of example embodiments of portions 394, 396, 398 of the process 370 are provided in FIGS. 8-10 below.

Figure 8:
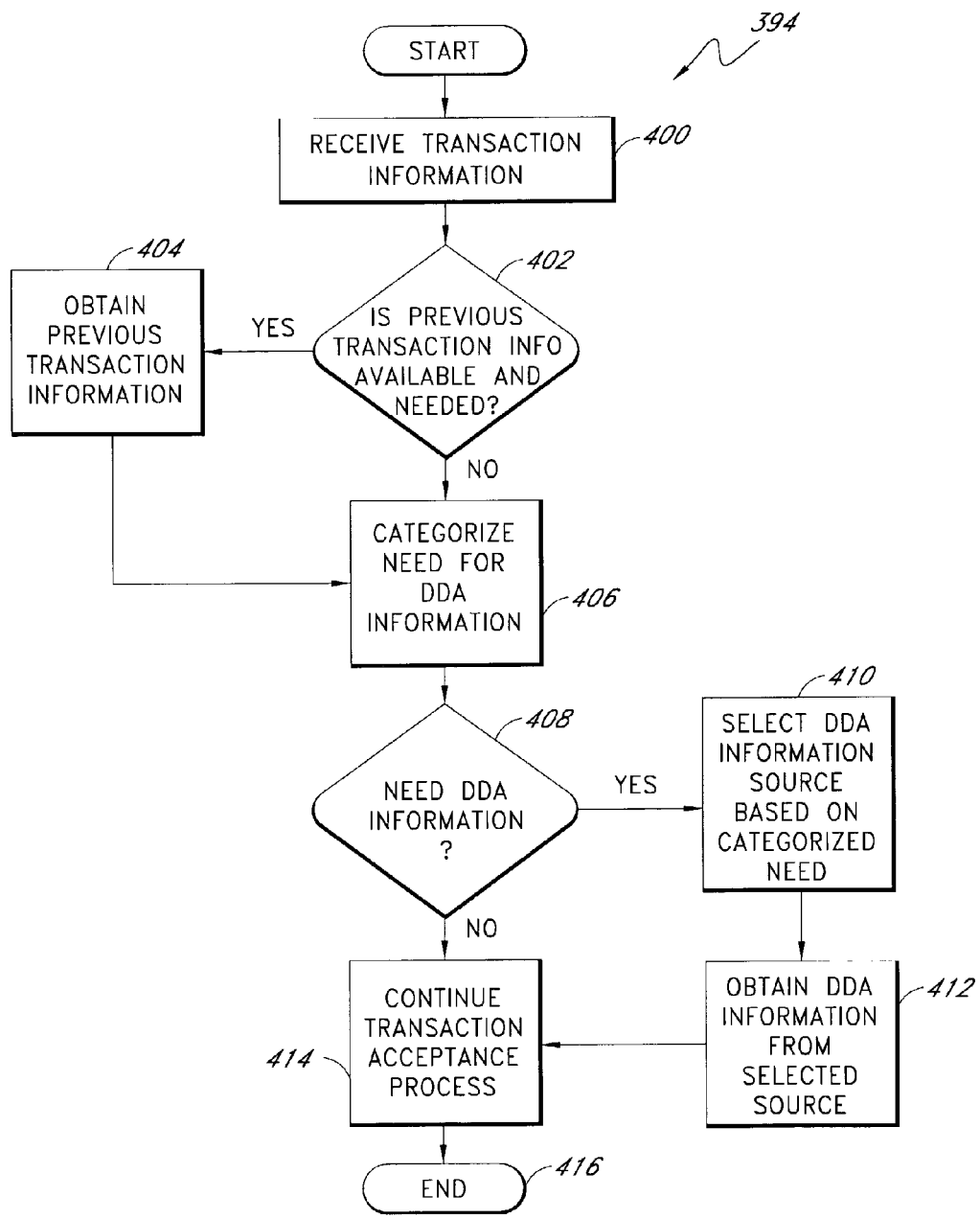
FIG. 8 is a flow chart depicting a more detailed view of one embodiment of processes to make a determination about whether to access DDA information, how to access DDA information, and how to use DDA information.

FIG. 8 is a flow chart that illustrates a more detailed view of a process 394 in which the check acceptance service 110 determines when and which of a plurality of sources of DDA information will be used to obtain DDA information to facilitate performing risk assessment of the transaction. As discussed herein, DDA information can be obtained from a plurality of different sources. In one embodiment, such DDA information comprises one or more of the following: information about the existence of a given account, status of an account, ownership of accounts, and amounts contained within DDA accounts. However, the information contained in different sources can vary and the cost of accessing different sources can also vary. For example, some sources may provide more updated information as to the account status, but these sources may charge the check acceptance service 110 a higher fee in order to obtain the DDA information. Alternatively, less expensive sources may not be updated as frequently. However, given the specifics of a particular transaction, it may be that obtaining information from the less up-to-date source is justified in terms of the cost savings associated therewith and the degree of data currentness required for the current transaction. The evaluation of which DDA source to use in a given situation is thus dependent upon existing agreements with the merchant, the cost associated with the various DDA sources, the relevance and availability of the information contained by the sources, and, of course, on an assessment of the risk associated with the current transaction, such that the DDA information can be requested from the appropriate DDA information source.

The flow chart of FIG. 8 can be associated generally with the portion of FIG. 7 labeled 394. The flow chart of FIG. 8 illustrates one embodiment of a process in which the check acceptance service 110 can determine when and from where the DDA information is to be obtained. It will be appreciated, however, that while FIG. 8 illustrates one exemplary process by which the selection of a DDA source can be accomplished, various other embodiments can also be implemented.

Referring to FIG. 8, in this embodiment, the check acceptance service 110 initially receives the transaction information or details 142 from the merchant 106 as was described in greater detail with reference to FIG. 2. In one implementation, the transaction information 142 includes routing information identifying the bank and the account number associated with the customer's check, the transaction amount, information identifying the merchant, and also, potentially, information identifying the type of transaction, e.g., the class of merchant or the type of item being purchased. As was described with reference to FIG. 2, this information is used by the check acceptance service 110 to perform risk assessment of the transaction. Moreover, based upon this information, the check acceptance service 110 decides whether additional information, such as DDA information, is needed for the particular risk assessment task. In one embodiment, the decision may take into consideration rules that apply to transactions in general as well as rules that apply specifically to transactions from the given merchant and that are based on a service contract entered into with the merchant. In some embodiments, where the check acceptance service 110 has access to payment history information for an individual offering the promissory payment in a transaction, the check acceptance service 110 may assess risk based not only on the likelihood of successfully cashing the check upon first submitting it for settlement to the issuing bank, but based also on a broader understanding of the individual's payment patterns, such that it may be possible to distinguish situations in which even promissory payments that are not initially cashable may be predicted to eventually realize a net financial gain because of the addition of late or other penalty fees to the amount owed. Thus, a determination of expected financial gain may affect calculation of risk assessment.

As illustrated in FIG. 8, the check acceptance service 110 also determines in state 402 whether previously stored transaction information relating to this particular customer is available. If information about previous transactions has been stored, the check acceptance service 110 obtains this information in state 404, such that the check acceptance service 110 has both information indicative of the particular transaction into which the customer is entering with the merchant at the present time, as well as information indicative of the customer's previous known transactions, if any. If no previous records have been stored for this customer or this bank account, the process 394 moves directly on to state 406.

The information about the transaction, comprising both current and, if applicable, historical data, provides an indication as to the risk associated with accepting or declining the customer's proffered promissory payment. This transaction can then be assigned to a risk category in state 406 to determine whether DDA information should be sought before accepting or declining the particular promissory payment.

The manner in which the need for DDA information is determined with respect to the risk of the transaction can be accomplished in any of a number of different manners. However, the check acceptance service 110, in one embodiment, simply evaluates the size and type of the transaction, as well as the customer's previous history of check writing to determine whether there is a likelihood of this customer writing a check on a non-existent account or an account having insufficient funds to cover the promised payment.

Based upon this categorization, the check acceptance service 110 then decides in state 408 whether DDA information is needed. It will be appreciated that, in some circumstances, the transaction and historical information gathered previously would indicate that there is no need to access a source of DDA information. For example, a low dollar check amount, e.g., $20 or less, written to a grocery store to which the customer commonly writes checks for groceries, may have a sufficiently low dollar value and a sufficiently low likelihood of non-payment that the transactional cost of obtaining any DDA information is not warranted. In such a case, the process 394 may continue directly to state 414 where the transaction risk assessment process continues without drawing upon DDA information.

Alternatively, high-amount checks written to merchants that sell more one-time purchase items may require more elaborate risk assessment, and may therefore benefit from DDA information input. In the embodiment shown in FIG. 8, if the check acceptance service 110 determines in state 408 that DDA information is desirable, the check acceptance service 110 selects a source of DDA information in state 410. In this embodiment, the check acceptance service 110 preferably categorizes the need for the DDA information based upon the received transaction information and the check writing history of the particular customer. The categorization of the need may be accomplished based upon calculations performed by the risk engine 152 of the risk system 150, or may simply be the result of a metric or score that is calculated for the particular transaction based upon such factors as the merchant class, the transaction amount, the customer's previous history, and/or the various transaction costs and levels of quality associated with obtaining the DDA information from the various sources.

Once the source of DDA information has been selected based upon the categorized need in state 410, the check acceptance service 110 obtains the DDA information from the selected source 412 and continues with the transaction acceptance process in state 414. The transaction acceptance process in state 414 will generally result in a continuation of risk assessment using DDA information, if it was obtained, or may require one or more additional risk assessment steps depending upon whether the DDA information was obtained prior to any risk assessment, during the middle of risk assessment or post-risk assessment as will be discussed in greater detail below.

Although the flow chart of FIG. 8 has been described as presenting a more detailed view of section 394 of the risk assessment process 370 from FIG. 7, which refers generally to a pre-risk-score portion of the process 370, the methods and steps of the FIG. 8 flow chart may also be performed in association with other portions of a transactional risk assessment that has the ability to draw upon DDA information.

Figure 9:
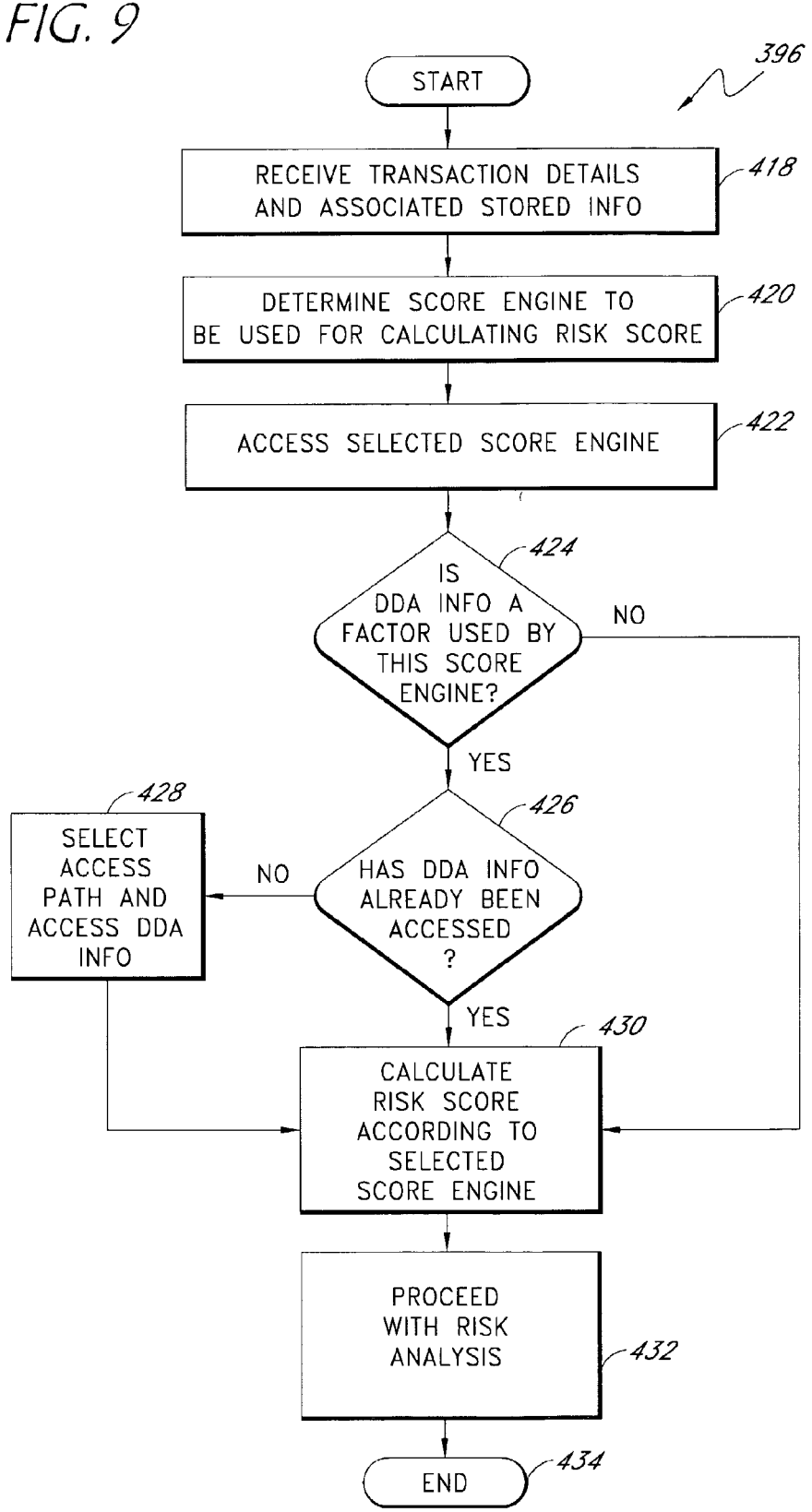
FIG. 9 is a flow chart depicting a more detailed view of one embodiment of processes to determine whether to access and how to use DDA information during a risk scoring process.

FIG. 9 is a flow chart that describes in greater detail one embodiment of a decision-making process regarding the access and use of DDA information in association with a risk-scoring portion of a check transaction's risk assessment. The flow chart of FIG. 9 can be associated generally with the portion of FIG. 7 labeled 396.

As described in FIG. 9, the process 396 begins in state 418 where transaction details for the current transaction, along with any associated stored historical information for the customer, are received. Using the information received in state 418, the process 396 determines in state 420 which scoring engine 154 is appropriate for assessing the current transaction. In state 422, the selected scoring engine 154 is accessed, and in state 424, the scoring engine 154 determines whether DDA information is desirable for calculating a risk score for the current transaction. In some embodiments, a scoring engine 154 may be configured to use DDA information to calculate a risk score if the DDA information is available, and to calculate a score without considering DDA information if the DDA information is not available, or if the DDA information is determined not to be useful for the current transaction.

If DDA information is not needed for this score engine 154, the process 396 moves on to state 430 where a risk score for the transaction is calculated according to the selected score engine.

Returning to state 424, if the process 396 determines that DDA information is desired by the score engine 154, the process 396 determines in state 426 whether DDA information has already been obtained for the current transaction. If DDA information has already been obtained, the process 396 moves on to state 430 where a risk score for the transaction is calculated according to the selected score engine.

Returning to state 426, if the process 396 determines that DDA information has not yet been obtained for the current transaction, the process moves to state 428, where an access path is selected and the DDA information obtained in a manner similar to that described with reference to FIG. 8.

Figure 10:
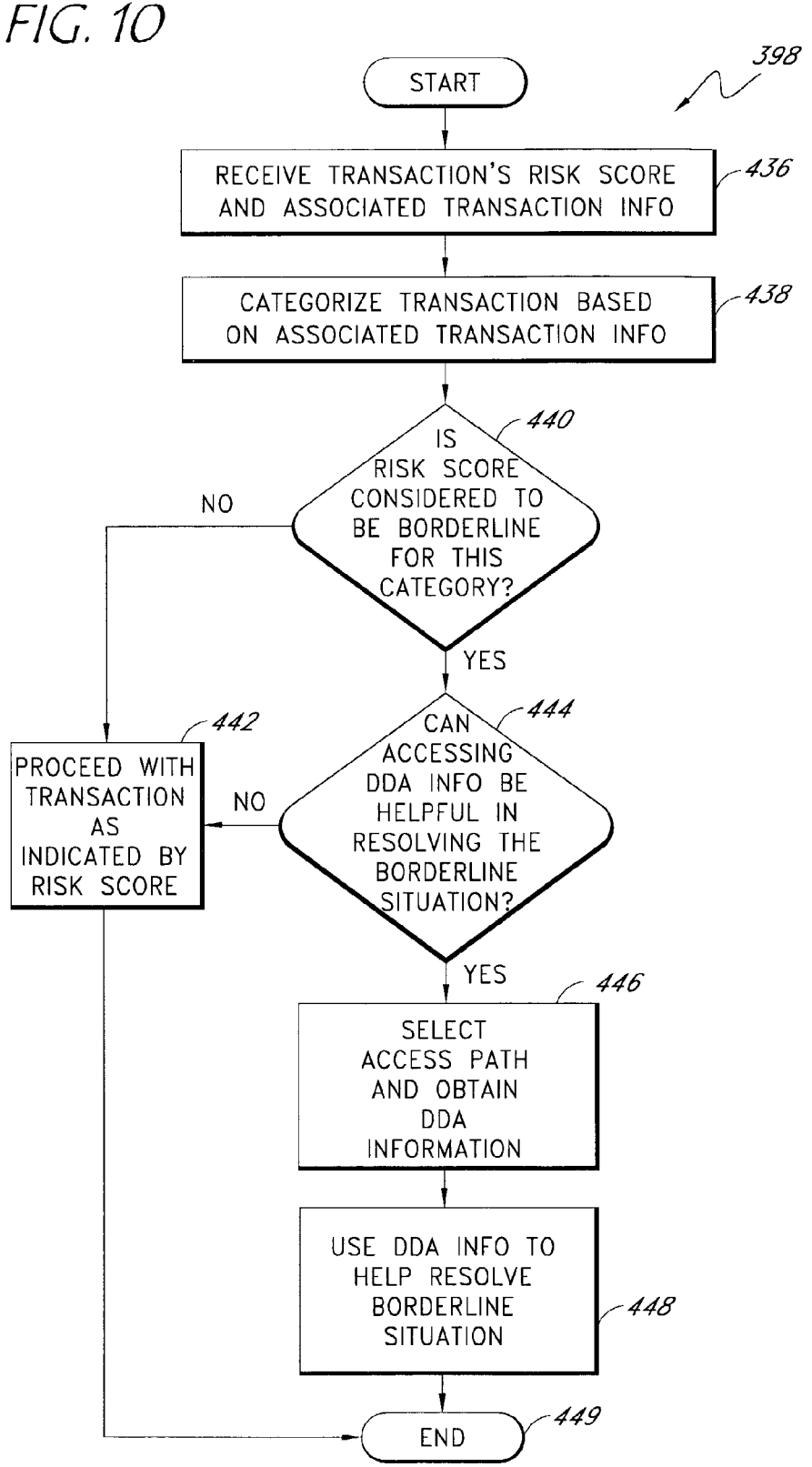
FIG. 10 is a flow chart depicting a more detailed view of an embodiment of processes to determine whether to access and how to use DDA information for resolving borderline cases in a risk scoring process.

FIG. 10 is a flow chart that portrays one embodiment of a process to determine whether to access DDA information to aid in decision-making when a borderline situation is reached in a risk assessment process. The FIG. 10 flow chart relates generally to the portion of the FIG. 7 flow chart that is labeled with call number 398. In one embodiment, this portion 398 of the process 370 relates to refinements and adjustments that may be desired after a risk score has been calculated for a given transaction. For example, if a risk score is calculated that is within a given distance from an accept/reject cut-off value, as will be described in greater detail with reference to FIG. 11, then it may be desirable to perform extra risk assessment steps for maximum assessment accuracy. Although the process 398 in FIG. 10 is described in terms of relating to a risk score assessment, it is to be understood that the process 398 could also operate with respect to any kind of assessment decision, provisional decision, or set of provisional decisions or plans of further assessment action.

In the flow chart depicted in FIG. 10, the process 398 begins in state 436 with the receipt of transaction information that comprises a risk score calculated for the transaction. The process 398 moves to state 438 where the transaction is categorized based on the associated transaction information. One example of transaction information that may be relevant to the process 398 at this point is the contracted level of service that the check acceptance service 110 has agreed to provide to the merchant 106. For example, if the check acceptance service 110 has contracted to buy the accepted checks outright, they may be categorized and treated differently than if the service is merely guaranteeing the checks. For a given purchased check, if DDA information indicates that the account is not closed, and if risk assessment analysis indicates that any initial non-payment of this check will likely result in speedy subsequent payment of the check amount plus additional late fees, then the post-scoring analysis may adjust a borderline score in favor of acceptance.

Once the transaction has been categorized in state 438, the process 398 proceeds to state 440 where it determines if the current risk score is considered to be within a borderline range for the given category. If the risk score is determined to be outside of a borderline range, then the process 398 moves on to state 442 where the transaction is processed (accepted or declined) as indicated by the risk score, and this portion 398 of the risk assessment process 370 can end in state 449.

Returning to state 440, if the process 398 determines that the risk score is within a borderline range for the given category, then the process 398 moves to state 444 where the process 398 determines whether accessing DDA information can be helpful in resolving the borderline assessment. For example, if DDA information has been obtained previously and has been used to arrive at the current risk score, then there is typically no advantage to accessing the DDA information again. If DDA information has not previously been used in the current risk assessment, then obtaining DDA information may be helpful in resolving the borderline situation.

Thus, in state 444, if accessing DDA information is determined not to be desirable, then the process moves to state 442, where the transaction is processed (accepted or declined) as indicated by the risk score, and, as described above, this portion 398 of the risk assessment process 370 can end in state 449.

If, in state 444, accessing DDA information is determined to be desirable, then the process moves to state 446 where an access path is selected, as was described with reference to FIG. 8, and DDA information is obtained. Moving on to state 448, the DDA information is used to help resolve the borderline situation, as will be portrayed in two example situations described after FIG. 11 below, and this portion 398 of the risk assessment process 370 can end in state 449.

Figure 11:
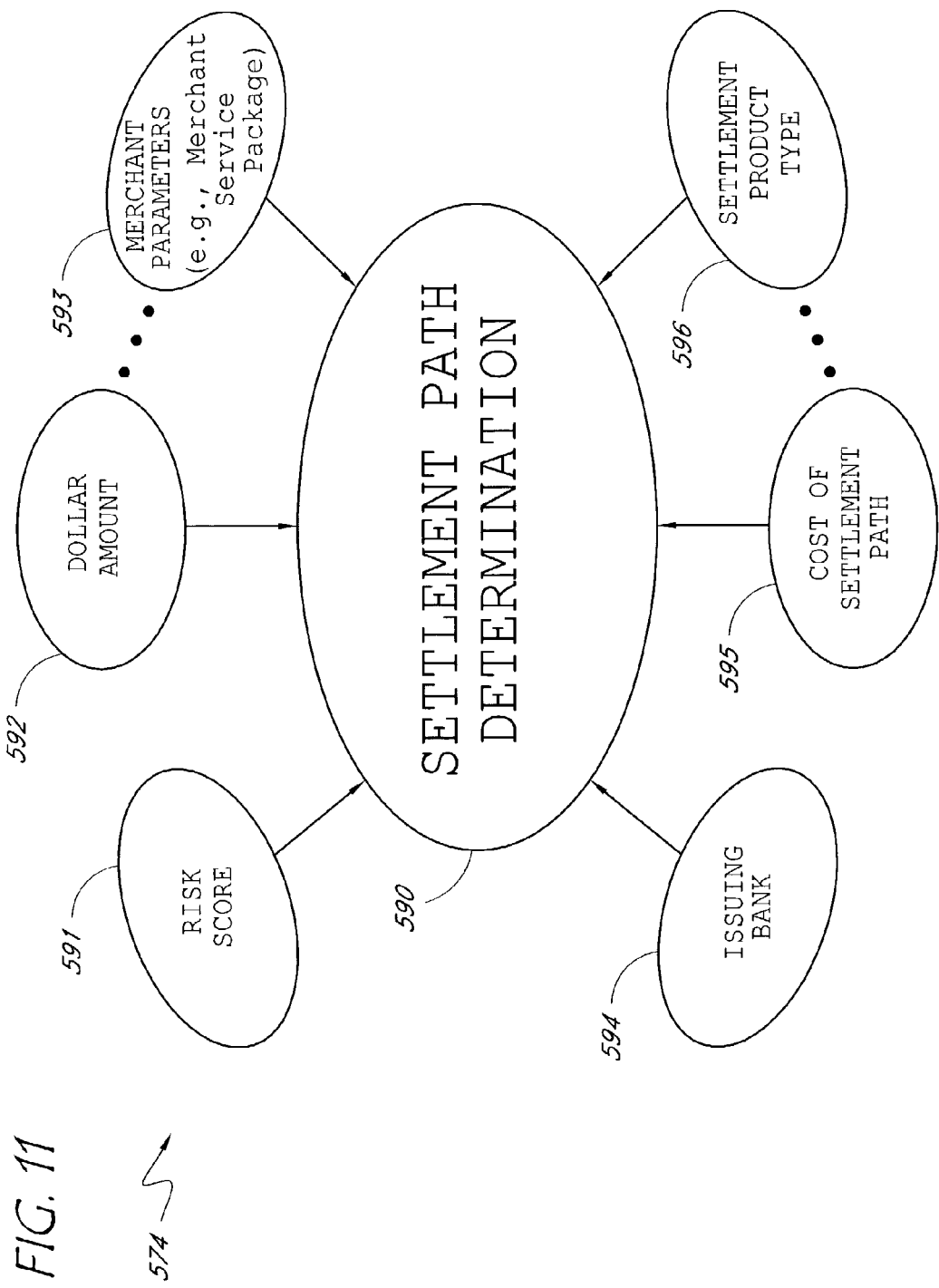
FIG. 11 is a block diagram illustrating one embodiment of selective use of DDA information.

FIG. 11 is a block diagram that illustrates one embodiment of a method to selectively use DDA information in conjunction with an overall process of risk assessment. The method depicted in the diagram makes the simplifying assumption (for ease of illustration) that the risk assessment at this stage can be represented by an accept/decline decision 471, 472, 473 that is based on a linear combination of decision factors 210-212, 451. In other embodiments, DDA information 451 may be integrated with other decision factors 210-212 in a rule-based system, a decision tree, a neural network, a Bayesian or other probabilistic network, or other calculation or decision-making system. In various embodiments, the outcome of such an integration of DDA information 451 and other decision factors 210-212 may be a score, a rating, a decision, or other decision-influencing result.

The decision factors 450 shown in FIG. 11 comprise merchant type 211, risk score 212, check amount 210, and others, along with the DDA information 451. This set of decision factors 450 may be substantially the same as the variables 210-215 used for the determination process 200 regarding whether or not to access DDA information, as was described with reference to FIG. 5. In FIG. 11, however, the DDA information 451 is available and is used as an additional decision factor.

The decision models 461-463 of FIG. 11 are used to represent the fact that the decision factors 450 used for risk assessment may be combined in different ways in order to generate accept/decline decisions 471-473 for different types of transaction situations. The individual decision models 461, 462, 463 in FIG. 11 apply different sets of weights 460 to the decision factors 450. For example, Decision Model A 461 weights the DDA information 451 by a factor of four, the merchant type 211 by a factor of two, and uses the risk score 212 and check amount 210 unweighted in order to generate an accept/decline decision 471. Thus, Decision Model A can represent a situation in which DDA information 451 exerts a strong influence on the decision 471 and may overrule the other decision factors 210-212. Decision Model A may be invoked, for example, in a situation in which a check acceptance service has agreed to access and retrieve DDA information for a merchant without providing any additional risk assessment services and without accepting any liability for transaction decisions.

Decision Model B 462 heavily weights the influence of the check amount 210 as a decision factor, and ignores information about the merchant type 211 altogether. Thus, the check amount 210 may overrule the effect of the DDA information 451 in generating the accept/decline decision 472. Decision Model N 463 shows another combination of weights 460 placed on the decision factors 450 in order to generate an accept/decline decision 473. Model N may be appropriate, for example, in a situation where the amount of the check in question is high and DDA information indicates that the associated account is closed.

Decision models of various types are generated to suit the varied transaction situations that are assessed by the risk system 150. In one embodiment, historical records of past check transactions are statistically analyzed to identify transaction situations with similar patterns. Decision models can then be generated that are designed to accurately assess the risk of specific transaction situations. Integrating DDA information 451 with other decision factors 210-212, rather than using DDA information 451 as a sole decision factor, allows for a risk assessment that is customized to the specific characteristics of a current transaction.

As another example, in one embodiment, when DDA information is integrated with a post-scoring risk assessment, the following situations could occur:

Situation 1: The risk score of a current transaction is below the authorization cut-off point, so the original authorization decision is to decline. However, if the score is less than 10% from the authorization cut-off point, then Rule 1 applies:

RULE 1: If the DDA response code is OPEN,
then APPROVE acceptance of check,
else DECLINE acceptance of check.

Thus, in a case where the risk score is narrowly below the cut-off, a positive DDA response can be used to overturn an original decision to decline.

Situation 2: The risk score of a current transaction is above the authorization cut-off point, so the original authorization decision is to approve. However, if the score is between 1% and 10% from the authorization cut-off point, then Rule 2 applies:

RULE 2 If the DDA response code is NSF,
then DECLINE acceptance of check,
else APPROVE acceptance of check.

Thus, in a case where the risk score is narrowly above the cut-off, a negative DDA response can be used to overturn an original decision to approve. For example, if the risk score indicates that the risk of a transaction is borderline high, but not high enough to outright decline the transaction, and if DDA information is then accessed indicating that the account is closed, a decision can be made to decline the transaction.

Selective Determination of DDA Settlement Path

Once a check, or other promissory payment instrument for initiating payment from a DDA account, has been accepted, several options exist for settling the debt with the issuing bank.

Figure 12:
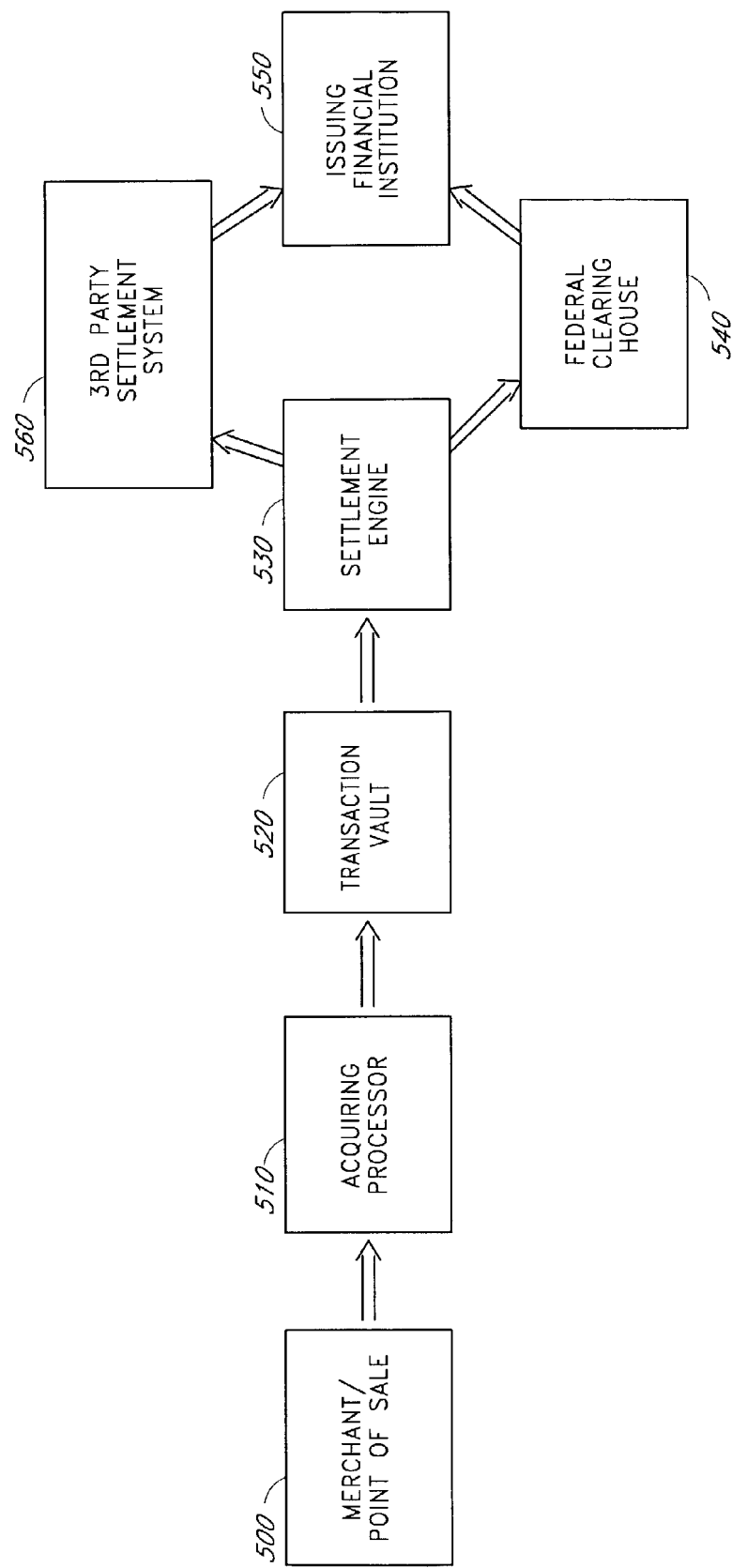
FIG. 12 is a diagram depicting one embodiment of selective determination of a settlement path for a received check.

FIG. 12 depicts one embodiment of a check settlement system, which begins with a merchant 500 accepting a proffered paper check at a point of sale. In FIG. 12, the merchant 500 converts the paper check into an electronic check at the point of sale and returns the cancelled paper check to the customer. In the embodiment shown, an acquiring processor 510, such as a check acceptance service or other entity, purchases the electronic check from the merchant 500 or contracts with the merchant 500 to undertake settlement of the check. The acquiring processor 510 may accumulate such acquired checks in a "transaction vault" 520 before submitting them to a settlement component known as a settlement engine 530. The settlement engine 530 determines, based at least in part on the available settlement paths and their characteristics, as well as on relevant information about the characteristics of the check(s) to be settled, which settlement path will be cost-effective, available, convenient, and/or expedient for a given check.

In the FIG. 12 embodiment, the settlement engine 530 does not have direct access to the issuing financial institution 550 that holds the DDA. The settlement engine 530, therefore, may choose to settle the check via a federal clearinghouse 540 that has direct access to the issuing bank 550 or via a third party settlement system 560 that also has direct access to the issuing bank 550. The factors that influence this choice are discussed below with reference to FIG. 14.

Figure 13:
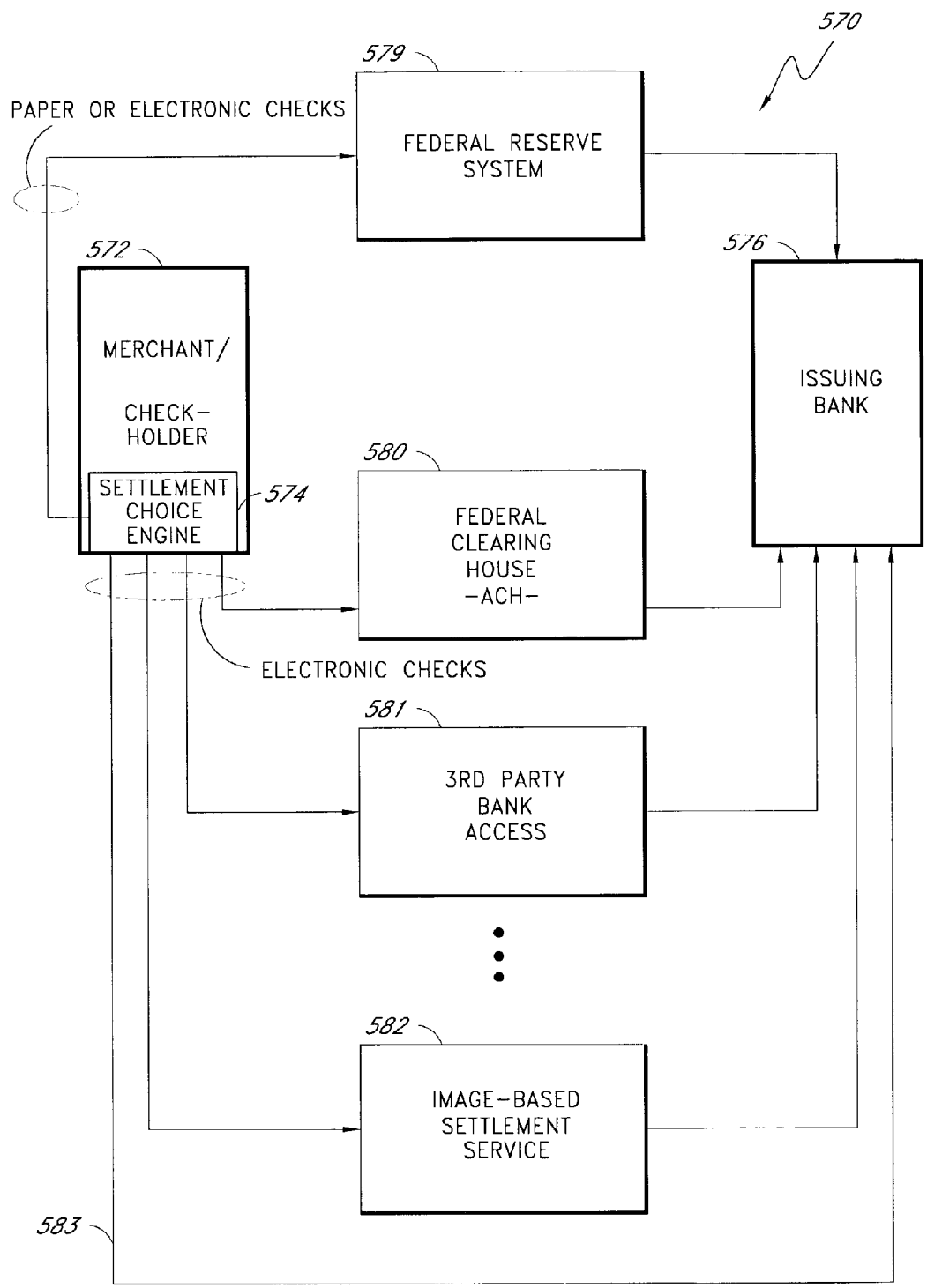
FIG. 13 is a more detailed depiction of the options available in one embodiment of selective settlement path determination.

FIG. 13 presents another embodiment of a system 570 that intelligently selects a settlement path to meet a check-holder's needs. In the FIG. 13 embodiment, a check-holder 572 is holding a proffered promissory payment in the form of a check to be settled. The check-holder 572 in this figure can be the merchant who received the check from the customer, or the check-holder 572 can be another entity that has acquired the check. For example, as described above with reference to FIG. 1, a check acceptance service 110 or other agency can contract to settle a check 102 for a merchant 106 or other check-holder. In such a case, the check acceptance service 110 or agency is serving as the check-holder and is settling the check 102 on behalf of the merchant. Alternatively, a check acceptance service 110 can buy a check outright from a merchant or other check-holder. In this case, the check acceptance service 110 settles the check 102 on its own behalf. Similarly, a bank or other entity can contract to settle a check on behalf of a check-holder and can alternatively purchase the check outright. The ownership of a check may pass through several entities before being settled and any or all of those entities may serve the role of check-holder 572 as depicted in the embodiment shown in FIG. 13, if the entity makes use of a settlement choice engine 574 or other settlement component to select one from amongst a set of available settlement paths.

If the check to be settled is in paper form, the check-holder 572 can settle the check via the federal reserve system 579, which forwards the paper check to the issuing bank 576 for settlement.

In many situations, a merchant or other check-holder is able to convert a paper check into electronic form for processing and settlement. For example, at some point-of-sale locations, when a paper check is received as payment, a clerk runs the check through a cash register or other point-of-sale device to convert the information from the check into electronic form and to "cancel" the paper check. The "cancelled" paper check can then be returned to the customer as a receipt of the transaction, and settlement of the check can proceed with the electronic version of the check.

If the check to be settled in FIG. 13 is received in electronic form or is translated into electronic form, a plurality of settlement methods or paths 579-583 exist for processing the check and for forwarding it to the issuing bank 576 to be settled. For example, as will be described in greater detail below, the settlement choice engine 574 may recommend sending the check to the issuing bank by way of the federal reserve system 579 that can also process paper checks. The settlement choice engine 574 may recommend a settlement path 583 that involves direct communication with the issuing bank 576, if direct communication 583 is available. Alternatively, the settlement choice engine 574 may recommend a settlement path 580-581 that involves using the services of a third party access entity to settle with the issuing bank 576.

Settlement paths 579-583 for settling electronic versions of checks may be implemented using a communications medium, such as the Internet or other global network of computers. In other embodiments, the communications medium can be any communication system including, by way of example, dedicated communication lines, telephone networks, wireless data transmission systems, two-way cable systems, customized computer networks, interactive kiosk networks, automatic teller machine networks, interactive television networks, and the like.

The check-holder 572 has access to a settlement choice engine 574 that selects a path 579-583 that it judges to be expedient for the check-holder's 572 needs. The settlement choice engine 574 comprises program logic that considers a number of factors, as will be described in greater detail with reference to FIG. 14, and selects a path for settling the check. In one embodiment, the program logic may advantageously be implemented as one or more modules that may be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

In some embodiments, the check-holder 572 comprises or possesses the settlement choice engine 574, such as when a check settlement service 110 or agency, whose check processing system comprises a settlement choice engine 574, contracts with a merchant to settle the merchant's checks. In some embodiments, a check-holder 572 may contract to use the services of a settlement choice engine 574 that is owned by another entity or institution.

In FIG. 13, one settlement path 583 that may be available in some cases to the holder 572 of an electronic check is for the check-holder 572 to access the issuing bank 576 directly. When a check-holder 572 has the ability to access the issuing bank 576 directly, there is no need for the check-holder 572 to pay fees to an intermediary check access entity, such as those accessed by settlement paths 580-582.

When direct access to the issuing bank 576 is not available, or when another settlement path 579-582 is deemed to be more expedient, the settlement choice engine 574 may choose another path. For example, the settlement choice engine 574 may determine that an expedient settlement path for a given electronic check is to settle the check by way of a federal clearinghouse 580, for example by way of the Automated Clearing House (ACH), which can provide low-cost access to a large number of banks. Alternatively, the settlement engine 574 may choose to settle an electronic check by way of an image-based settlement service 582, or by way of one of a variety of other third party bank access services 581, such as an Automated Teller Machine (ATM) network, or by way of another available settlement path not shown explicitly in FIG. 13.

Various factors influence the settlement choice engine's 574 determination. FIG. 14 depicts some examples of the types of information 591-596 that are used as variables by one embodiment of a settlement choice engine 574. In general, individual settlement paths 580-583 differ in their characteristics and provide various advantages and/or disadvantages to a check-holder 572 choosing to settle a check via a given path. For example, a given settlement path may have a relatively high cost, but may provide a settlement speedily and/or may guarantee that settlement will be completed successfully or speedily. Another exemplary settlement path may demand a relatively low price for its services, but may require, for example, that all checks received on a given day be "bundled" together and be sent nightly for batch processing. Some settlement paths may have access to a limited number of banks. Thus, settlement paths may differ in terms of convenience, guarantees, service levels, transaction costs, and availability, among other differences.

In general, the settlement engine 574 aims to identify a preferred path given the context of the current check to be settled, by weighing and balancing the costs of utilizing a given settlement path 595 with the advantages and services provided by the settlement path 596 while taking into consideration any agreements made with the check-holder. Details about the current check to be settled that are relevant to the selection of a settlement path comprise, but are not limited to, such variables as: a risk score 591 or other risk-based category calculated for the check, a dollar amount 592 of the check, issuing bank 594 of the check 594, and, if the check is being settled on behalf of a merchant, relevant merchant parameters 593. Relevant merchant parameters 593 may comprise, but are not limited to, merchant type and/or merchant preferences, including stipulation of pre-determined criteria for settling via a given settlement path 580-583. Relevant issues related to settlement product type 596 may comprise, but are not limited to, information such as which banks can be accessed by a given settlement path 580-583, typical amount of time taken to settle a check via a given settlement path 580-583, and whether extra services, such as guarantees of settlement, which are provided by some settlement paths 580-583, are available.

The risk score 591 and dollar amount 592 of a given check may be relevant to a determination of settlement path 590 when, for example, the settlement engine 574 determines that a high-risk, high dollar-amount check warrants the use of a more expensive and more guaranteed settlement path 579-583. The issuing bank 594 for a given check is a relevant factor to a settlement path determination 590 because a given settlement path 579-583 may not have access to the bank 576 that issued a given check. In such a case, the settlement engine 574 makes its determination from amongst the settlement paths 579-583 that have access to the issuing bank 576 (either directly, or via another intermediary party).

As an example of one way in which determination factors are combined to select a settlement path, two checks that both have low risk scores and that are both written for low dollar amounts may be settled via different settlement paths, if other characteristics of the two checks lead the settlement engine 574 to such a determination. One of the checks may have been received from a merchant 572 who has contracted with a check acceptance service 110 to provide guaranteed settlement service. The settlement engine 572 of the check acceptance service 110 may determine that the risk is low enough to allow for settlement via the low-priced ACH 580 even though settlement may take two days to be completed.

A second of the two checks may be a check that did not come directly from a merchant 106 who received the check 102 in exchange for goods or services 104, but from an intermediary check acquirer, such as a bank, who has acquired the check 102 from the merchant 106 and has contracted with the check acceptance service 110 to settle its checks 102. In this case, the settlement choice engine 574 may elect to settle via a third party bank access service 581, such as an automated teller machine (ATM) network, if this path is stipulated by the contract with the intermediary check acquirer.

In a similar manner, the settlement choice engine 574 may choose to settle two checks differently, even if, for example, both checks are assessed as being high-risk and are written for high dollar amounts. If with one of the checks, the merchant involved has contracted for guaranteed service, the check-holder 572 may choose a more direct and expeditious settlement path, with less emphasis on the cost of settlement. If, with the second check, the merchant involved has not contracted for guaranteed service, and if the merchant is only willing to pay for a lower-priced service, the check-holder 572 may choose to settle via the ACH 580.

As will be familiar to one reasonably skilled in the art, some or all of the variables and factors 591-596, such as those in the embodiment shown in FIG. 14, along with, or replaced by, other relevant factors, may be used for decision-making by the settlement choice engine 574. The factors may be combined, integrated, synthesized, or otherwise utilized in a decision tree, calculation, formula, rule set, probabilistic network, search algorithm, other logical framework, or other method to take advantage of the available information in order to determine an expedient settlement path.

FIG. 15 is a flow chart that depicts one embodiment of a process 600 to determine a desirable settlement path for settling a check with an issuing bank. From a start state, the process 600 moves to state 602, where the check acceptance service or other check-holder 572 receives the check to be settled, along with information about the transaction associated with the check. In state 606, the process 600 reviews information about the merchant or other check-provider from whom the check was received. For example, the check-holder may have received the check from a bank that purchased the check from the merchant who originally received it. The bank may contract with the check acceptance service to settle the check. The information referred to in state 604 may comprise information about the settlement service contract associated with the given check-provider. In state 606, the process 600 determines whether the settlement service agreement with the merchant or other check-provider dictates a given settlement path. For example, a bank that contracts with a third party to settle the bank's purchased checks may stipulate that all settlement must take place via an associate of the bank.

Thus, if, in state 606 the process 600 determines that use of a given settlement path is mandated by the agreement with the merchant, then the process moves to state 608 where the check is settled using the dictated settlement path and the process 600 ends in state 622.

Returning to state 606, if the process 600 determines that no settlement path is mandated by an agreement with the merchant or other check-provider, then the process 600 moves to state 610, where the check routing number is reviewed in order to identify the issuing bank 576 of the check.

In state 612, the process 600 determines which settlement paths are available for the issuing bank 576 that was identified in state 610. As was described with reference to FIG. 13, some settlement paths do not have access to all possible issuing banks. Thus, in state 612, the set of possible settlement paths for the check in question is narrowed down to comprise those that do provide access to the identified issuing bank. In one embodiment, the check holder has access to a table comprising information about settlement paths to which it has access, services offered by those settlement paths (for example, which issuing banks may be accessed via a given path), and prices for using the services offered Moving on to state 614, the process 600 determines if the set of settlement paths identified in state 612 comprises more than one settlement path.

If only one settlement path is available for settling with the issuing bank, then the process 600 moves to state 616, where it settles the check with the available settlement path, and moves to state 622 to end.

If, in state 614, the process 600 determines that more than one available settlement path may be used for accessing the given issuing bank, then the process moves to state 618, where the process 600 selects a settlement path based on the characteristics of the available settlement paths and based on the details of the current transaction, as has been described with reference to FIGS. 13 and 14. In one embodiment, the selection of state 618 is implemented using a decision tree that takes into consideration the service agreement with the check-provider and the costs and advantages of the various settlement paths.

Once a desirable settlement path has been selected in state 618, control passes to state 620, where the check is settled using the selected settlement path, and then on to state 622 where the process 600 ends.

In one embodiment, an attempt to settle a check using the selected settlement path may fail for one or more of a number of reasons. For example, the process 600 may allow a limited amount of time for executing the settlement process with the issuing bank, and, due to problems at the issuing bank or congestion in communication lines to the bank, the process 600 may time-out before the settlement can be completed. As another example, the check-holder may receive a response code indicating "Bank Not Available" in response to a settlement request sent to the issuing bank. In such cases, the process 600 may have the capability of returning to state 618 to select another available settlement, until the process 600 is able to successfully settle the check.

It will be appreciated that while the descriptions in FIGS. 1-15 address a check transaction, the inventive concepts and methods disclosed herein are applicable to other types of transactions that involve risks and/or that involve a determination of an expedient course of action in a given risk situation. These types of transactions may comprise, but are not limited to, credit card transactions, loan applications, insurance applications, and job applications.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A computer implemented method comprising executing computer executable instructions by one or more processors for evaluating the risk of a merchant accepting a proffered promissory payment in a financial transaction and of providing an indication to the merchant to accept or to decline the promissory payment, wherein the payment is drawn on a demand deposit account (DDA), the method comprising:

receiving information about the financial transaction, wherein the information comprises at least one of: information about the promissory payment, information about an individual proffering the promissory payment, and information about the merchant;

invoking one or more pre-scoring rules to evaluate the financial transaction;

accessing DDA access path rules;

if the DDA access path rules specify a merchant stipulated DDA access path, selecting, by the one or more processors, the merchant stipulated DDA access path;

if the DDA access path rules do not specify a merchant stipulated DDA access path, selecting, via an access path determination engine, a DDA information source based at least in part on the DDA access path rules, wherein the access path determination engine is executable by the one or more processors;

invoking one or more scoring rule matrix to evaluate whether to access additional DDA information;

invoking the access path determination engine in order to select an expedient DDA access path;

accessing additional associated information comprising at least one of: information about a payment history associated with the individual or other information relevant to a risk evaluation of accepting a promissory payment from the individual, information about a service agreement with the merchant that stipulates characteristics of the risk assessment information about risk patterns associated with the merchant, and information about the DDA on which the promissory payment is drawn;

using at least some of the received information and the additional associated information to perform a risk assessment indicative of a level of risk associated with accepting the promissory payment;

invoking post-score rules to determine whether further risk assessment is desirable to confirm or to overturn the assessment and whether further additional DDA information is needed;

invoking the access path determination engine if desirable in order to select a DDA access path;

assessing further additional DDA information via the DDA access path selected by the access path determination engine;

performing further risk assessment, if desirable, based at least in part on the further additional DDA info to determine if a risk level associated with accepting the promissory payment is acceptable or unacceptable; and providing an indication to the merchant to accept the promissory payment if the risk level is evaluated to be acceptable and to decline the promissory payment if the risk level is evaluated to be unacceptable.

2. The method of claim 1, wherein the promissory payment is a check and the DDA is a checking account, and the check is drawn on the checking account.

3. The method of claim, 1, wherein the DDA information comprises information about the sufficiency of funds in the DDA to cove the amount of the promissory payment and about whether the DDA is open or closed.

4. The method of claim 1, further comprising requesting and obtaining the DDA information from an external source if DDA information is not otherwise available for use in performing the risk assessment or the further risk assessment.

5. The method of claim 1, wherein the information about the merchant comprises a merchant type categorization that groups the merchant with other merchants exhibiting similar customer purchase patterns and similar promissory payment risk patterns.

6. The method of claim 1, wherein the information about the individual comprises information about the individual's payment history.

7. The method of claim 1, wherein performing a risk assessment indicative of a level of risk comprises taking into consideration at least one of: information about the promissory payment, information about the DDA, information about the merchant, and information about the individual, information about available sources of DDA information, and information about a probable amount of financial gain associated with accepting the promissory payment if the payment is not initially paid.

8. The method of claim 1, wherein performing a further risk assessment comprises using a system of decision rules.

9. The method of claim 1, wherein performing a further risk assessment comprises calculating a risk score.

10. The method of claim 9, wherein the risk score is associated with one of at least three possible risk categories: acceptable risk, unacceptable risk, and borderline risk.

11. The method of claim 1, wherein determining if further assessment is desirable comprises determining if the risk category indicates borderline risk.

12. The method of claim 1, wherein determining if further assessment is desirable comprises determining if considering DDA information will allow for enhanced accuracy of the risk assessment.

13. The method of claim 1, wherein determining if further assessment is desirable comprises determining that further risk assessment is desirable if DDA information was not used in performing the risk.

14. The method of claim 1, wherein determining if further assessment is desirable comprises determining whether accessing DDA will enable a more accurate risk assessment and, if so, whether the increased accuracy justifies resource costs associated with accessing the DDA information.

15. The method of claim 1, wherein determining if further assessment is desirable comprises performing further risk assessment in all cases.

16. The method of claim 1, wherein performing a further risk assessment comprises determining if sufficient funds exist in the demand deposit account to cover the proffered promissory payment.

17. The method of claim 1, wherein performing a further risk assessment comprises determining a probable amount of financial gain from accepting the promissory payment.

18. The method of claim 1, wherein performing a further risk assessment comprises determining a probable amount of financial gain from accepting the promissory payment if the payment is not initially cashable and if additional late fees are assessed.

19. The method of claim 1, wherein performing a further risk assessment comprises selecting a source of DDA information and obtaining DDA information if DDA information is not already available.

20. A system for assessing the risk of accepting a promissory payment proffered in a financial transaction, the system comprising:

at least one processor configured to execute computer executable instructions for:

transmitting information about the proffered payment from a point of sale device to a central location;

invoking one or more pre-scoring rules to evaluate the financial transaction;

evaluating at the central location the risk of accepting the proffered promissory payment that categorizes the risk into at least a category of acceptable risk and unacceptable risk;

determining, if the risk is unacceptable, whether to re-evaluate the risk;

accessing DDA access path rules;

if the DDA access path rules specify a merchant stipulated DDA access path, selecting, by the one or more processors, the merchant stipulated DDA access path;

if the DDA access path rules do not specify a merchant stipulated DDA access path, selecting, via an access path determination engine, a DDA information source based at least in part on the DDA access path rules, wherein the access path determination engine is executable by the one or more processors;

invoking one or more scoring rule matrix to evaluate whether to access additional DDA information;

invoking the access path determination engine in order to select an expedient DDA access path;

re-evaluating, based at least in part on information about the demand deposit account (DDA) corresponding to the proffered promissory payment, the risk of accepting the proffered promissory payment;

invoking post-score rules to determine whether further risk assessment is desirable to confirm or to overturn the assessment and whether further additional DDA information is needed;

invoking the access path determination engine if desirable in order to select a DDA access path;

assessing further additional DDA information via the DDA access path selected by the access path determination engine;

performing further risk assessment, if desirable, based at least in part on the further additional DDA info to determine if a risk level associated with accepting the promissory payment is acceptable or unacceptable; and providing an indication to the merchant to accept the promissory payment if the risk level is evaluated to be acceptable and to decline the promissory payment if the risk level is evaluated to be unacceptable.

21. The system of claim 20, wherein the promissory payment is a tendered check drawn on the DDA.

22. The system of claim 20, wherein re-evaluating the risk comprises using information from the DDA comprising information about the sufficiency of funds in the DDA to cover the amount of the promissory payment and about whether the DDA is open or closed.

23. The system of claim 20, wherein the at least one processor is further configured to execute computer executable instructions for providing an indication of the re-evaluated risk assessment to the point of sale device comprising advising whether to accept or decline the promissory payment.

24. The system of claim 23, wherein the at least one processor is further operable for executing computer executable instructions for providing the indication via a distributed electronic network.

25. The system of claim 20, wherein re-evaluating the risk comprises receiving information about the DDA from a source belonging to the group consisting of: an issuing financial institution associated with the demand deposit account, a third party entity that provides access to the issuing financial institution, a third party entity that maintains a copy of demand deposit information from the issuing financial institution, and an internal database that stores a copy of demand deposit information from the issuing financial institution.

26. The system of claim 20, wherein re-evaluating further comprises accessing and utilizing stored information about a merchant associated with the point of sale device, wherein the merchant information comprises a merchant type categorization that groups the merchant with other merchants exhibiting similar customer purchase patterns and similar promissory payment risk patterns.

27. The system of claim 20, wherein re-evaluating further comprises accessing and utilizing stored information about a customer proffering the promissory payment, wherein the stored information comprises information relevant to an assessment of the risk of accepting a promissory payment from the customer.

28. The system of claim 27, wherein the information about the customer comprises information about the customer's payment history.

29. The system of claim 20, wherein calculating an initial risk score comprises taking into consideration at least one of: information about the promissory payment information about the DDA, information about the merchant, and information about a customer proffering the promissory payment, information about available sources of DDA information, and information about a probable amount of financial gain associated with accepting the promissory payment if the payment is not initially paid.

30. The system of claim 20, wherein the utilizing the DDA information to enhance the initial risk score is performed using a system of decision rules.

31. The system of claim 20, wherein the utilizing the DDA information to enhance the initial risk score comprises recalculating the risk score.

32. The system of claim 20, wherein utilizing the DDA information to enhance the risk score comprises determining if sufficient funds exist in the demand deposit account to cover the proffered promissory payment and wherein providing an indication of the assessment comprises advising the merchant not to accept the proffered payment when there are insufficient funds in the demand deposit account.

33. The system of claim 20, wherein utilizing the DDA information to enhance the risk score comprises determining if sufficient funds exist in the DDA to cover the proffered promissory payment and taking into consideration other information, said other information comprising at least one of: payment history information associated with the DDA, promissory payment history information associated with the merchant and with other merchants exhibiting similar promissory payment risk patterns, information about the transaction, and a probable amount of late fees or other form of financial gain if the promissory payment is not initially cashable, such that providing the indication of the risk assessment may comprise advising the merchant to accept the proffered payment even when there are insufficient funds in the demand deposit account.

34. The system of claim 20, wherein calculating the initial risk score comprises taking into consideration the information about the demand deposit account.

35. The system of claim 20, wherein receiving information about the demand deposit account comprises:

determining if requesting demand deposit information is desirable for performing the risk assessment;

selecting a source of the demand deposit account information based upon the determination;

transmitting a request for demand deposit account information to the selected source of the demand deposit information; and receiving the information about the demand deposit account from the selected source.

36. The system of claim 35, wherein determining if requesting DDA information is desirable is based at least in part on at least one of the group consisting of: the amount of the proffered promissory payment, payment history information associated with the DDA, auxiliary services offered by available sources of DDA information, resource costs associated with accessing DDA information from sources, a merchant category assigned to the merchant which is indicative of risk patterns associated with promissory payments proffered to merchants assigned to the category, a merchant agreement stipulating circumstances under which requesting DDA information is desirable, and a merchant agreement stipulating preferred sources of demand deposit information.

37. A computer program product, comprising computer usable medium having a computer readable program code embodied therein, said computer readable program code adapted to be executed to implement a method for determining whether to accept a check offered as payment in a check transaction, the method comprising:

receiving electronic information about a DDA against which a check that is offered as payment in a check transaction is drawn;

invoking one or more pre-scoring rules to evaluate the financial transaction;

generating a risk score indicative of a predicted level of risk for the check transaction;

accessing DDA access path rules;

if the DDA access path rules specify a merchant stipulated DDA access path, selecting, by the one or more processors, the merchant stipulated DDA access path;

if the DDA access path rules do not specify a merchant stipulated DDA access path, selecting, via an access path determination engine, a DDA information source based at least in part on the DDA access path rules, wherein the access path determination engine is executable by the one or more processors;

based at least in part on the risk score, selectively integrating use of the information from the DDA together with use of other information associated with the check transaction to generate a second risk score, wherein the manner of selectively integrating the DDA information and the other information is determined, at least in part, based on characteristics of the check transaction;

determining to accept the check if the second risk score indicates an acceptable level of risk associated with accepting the check and to decline the check if the second risk score indicates an unacceptable level of risk associated with accepting the check;

invoking one or more scoring rule matrix to evaluate whether to assess additional DDA information;

invoking the access path determination engine in order to select an expedient DDA access path;

accessing additional associated information and using at least some of the received information and the additional associated information to perform a risk assessment indicative of a level of risk associated with accepting the promissory payment;

invoking post-score rules to determine whether further risk assessment is desirable to confirm or to overturn the assessment and whether further additional DDA information is needed;

invoking the access path determination engine if desirable in order to select a DDA access path;

assessing further additional DDA information via the DDA access path selected by the access path determination engine;

performing further risk assessment, if desirable, based at least in part on the further additional DDA info to determine if a risk level associated with accepting the promissory payment is acceptable or unacceptable; and providing an indication to the merchant to accept the promissory payment if the risk level is evaluated to be acceptable and to decline the promissory payment if the risk level is evaluated to be unacceptable.

38. The computer program product of claim 37, wherein the information from the DDA comprises information about the sufficiency of funds in the DDA to cover the amount of the promissory payment and about whether the DDA is open or closed.

39. The computer program product of claim 37, wherein providing an indication of the risk assessment to the merchant comprises advising the merchant whether to accept or to decline the promissory payment.

40. The computer program product of claim 37, wherein providing an indication of the risk assessment to the merchant comprises advising the merchant via a distributed electronic network.

41. The computer program product of claim 37, wherein receiving information from the DDA comprises receiving the information from a source belonging to the group consisting of an issuing financial institution associated with the demand deposit account, a third party entity that provides access to the issuing financial institution, a third party entity that maintains a copy of demand deposit information from the issuing financial institution, and an internal database that stores a copy of demand deposit information from the issuing financial institution.

42. The computer program product of claim 37, further comprising accessing and utilizing stored information about the merchant comprising a merchant type categorization that groups the merchant with other merchants exhibiting similar customer purchase patterns and similar promissory payment risk patterns to enhance the risk score.

43. The computer program product of claim 37, further comprising accessing and utilizing stored information about a customer proffering the promissory payment to enhance the risk score, wherein the stored information comprises information relevant to an assessment of the risk of accepting a promissory payment from the customer.

44. The computer program product of claim 37, wherein the information about the customer comprises information about the customer's payment history.

45. The computer program product of claim 37, wherein calculating an initial risk score comprises taking into consideration at least one of: information about the promissory payment, information about the DDA, information about the merchant, and information about a customer proffering the promissory payment, information about available sources of DDA information, and information about a probable amount of financial gain associated with accepting the promissory payment if the payment is not initially paid.

46. The computer program product of claim 37, wherein the utilizing the DDA information to enhance the initial risk score is performed using a system of decision rules.

47. The computer program product of claim 37, wherein the utilizing the DDA information to enhance the initial risk score comprises recalculating the risk score.

48. The computer program product of claim 37, wherein utilizing the DDA information to enhance the risk score comprises determining if sufficient funds exist in the demand deposit account to cover the proffered promissory payment and wherein providing an indication of the assessment comprises advising the merchant not to accept the proffered payment when there are insufficient funds in the demand deposit account.

49. The computer program product of claim 37, wherein utilizing the DDA information to enhance the risk score comprises determining if sufficient funds exist in the DDA to cover the proffered promissory payment and taking into consideration other information, said other information comprising at least one of: payment history information associated with the DDA, promissory payment history information associated with the merchant and with other merchants exhibiting similar promissory payment risk patterns, information about the transaction, and a probable amount of late fees or other form of financial gain if the promissory payment is not initially cashable, such that providing the indication of the risk assessment may comprise advising the merchant to accept the proffered payment even when there are insufficient funds in the demand deposit account.

50. The computer program product of claim 37, wherein calculating the initial risk score comprises taking into consideration the information about the demand deposit account.

51. The computer program product of claim 37, wherein receiving information about the demand deposit account comprises:
- determining if requesting demand deposit information is desirable for performing the risk assessment;
- selecting a source of the demand deposit account information based upon the determination;
- transmitting a request for demand deposit account information to the selected source of the demand deposit information; and
- receiving the information about the demand deposit account from the selected source.

52. The computer program product of claim 51, wherein determining if requesting DDA information is desirable is based at least in part on at least one of the group consisting of: the amount of the proffered promissory payment, payment history information associated with the DDA, auxiliary services offered by available sources of DDA information, resource costs associated with accessing DDA information from sources, a merchant category assigned to the merchant which is indicative of risk patterns associated with promissory payments proffered to merchants assigned to the category, a merchant agreement stipulating circumstances under which requesting DDA information is desirable, and a merchant agreement stipulating preferred sources of demand deposit information.

53. A computer implemented method comprising executing computer executable instructions by one or more processors for determining whether to authorize acceptance of a promissory payment offered from a demand deposit account (DDA), the method comprising:
- accessing electronic information about a demand deposit account from which a promissory payment has been offered;
- invoking one or more pre-scoring rules to evaluate the financial transaction;
- using at least one of a plurality of available risk engines to generate a score, or other generated evaluation, that is indicative of a level of risk predicted for the promissory payment, to make an authorization decision;
- accessing DDA access path rules;
- if the DDA access path rules specify a merchant stipulated DDA access path, selecting, by the one or more processors, the merchant stipulated DDA access path;
- if the DDA access path rules do not specify a merchant stipulated DDA access path, selecting, via an access path determination engine, a DDA information source based at least in part on the DDA access path rules, wherein the access path determination engine is executable by the one or more processors;
- re-evaluating the authorization decision, based at least in part on the demand deposit account information;
- invoking one or more scoring rule matrix to evaluate whether to assess additional DDA information;
- invoking the access path determination engine in order to select an expedient DDA access path;
- accessing additional associated information and using at least some of the received information and the additional associated information to perform a risk assessment indicative of a level of risk associated with accepting the promissory payment;
- invoking post-score rules to determine whether further risk assessment is desirable to confirm or to overturn the assessment and whether further additional DDA information is needed;
- invoking the access path determination engine if desirable in order to select a DDA access path;
- assessing further additional DDA information via the DDA access path selected by the access path determination engine;
- performing further risk assessment, if desirable, based at least in part on the further additional DDA info to determine if a risk level associated with accepting the promissory payment is acceptable or unacceptable; and
- providing an indication to the merchant to accept the promissory payment if the risk level is evaluated to be acceptable and to decline the promissory payment if the risk level is evaluated to be unacceptable.

54. The method of claim 53, wherein the information from the DDA comprises information about the sufficiency of funds in the DDA to cover the amount of the promissory payment and about whether the DDA is open or closed.

55. The method of claim 53, further comprising providing an indication of the risk assessment with a recommendation to accept or to decline the promissory payment.

56. The method of claim 53, wherein accessing information about the DDA comprises receiving the information from a source belonging to the group consisting of: an issuing financial institution associated with the demand deposit account, a third party entity that provides access to the issuing financial institution, a third party entity that maintains a copy of demand deposit information from the issuing financial institution, and an internal database that stores a copy of demand deposit information from the issuing financial institution.

57. The method of claim 53, wherein re-evaluating further comprises accessing and utilizing stored information about the merchant comprising a merchant type categorization that groups the merchant with other merchants exhibiting similar customer purchase patterns and similar promissory payment risk patterns to enhance the accuracy of the authorization decision.

58. The method of claim 53, wherein re-evaluating further comprises accessing and utilizing stored information about a customer proffering the promissory payment to enhance the accuracy of the authorization decision, wherein the stored information comprises a promissory payment history for the customer.

59. The method of claim 53, wherein using one of a plurality of available risk engines comprises selecting a risk engine that is designed to assess the risk for transactions with conditions similar to those in which the promissory payment is offered.

60. The method of claim 53, wherein using a risk engine comprises taking into consideration at least one of: information about the promissory payment, information about the DDA, information about the merchant, and information about a customer proffering the promissory payment, information about available sources of DDA information, and information about a probable amount of financial gain associated with accepting the promissory payment comprising additional expected fees to be collected if the payment is initially uncashable.

61. The method of claim 53, wherein using a risk engine comprises calculating a risk score, and wherein re-evaluating the authorization decision comprises recalculating the risk score.

62. The method of claim 53, wherein re-evaluating the authorization decision further comprises taking into consideration at least one of: payment history information associated with the DDA, promissory payment history information associated with a merchant to whom the promissory payment is proffered and with other merchants exhibiting similar promissory payment risk patterns, information about an individual proffering the payment, and a probable amount financial gain from accepting the promissory payment that takes into consideration late fees or other fees due if the promissory payment is not initially cashable.

63. A computer implemented method comprising executing computer executable instructions by one or more processors for assessing risk associated with a merchant accepting a promissory payment in a financial transaction, wherein the method utilizes a scoring process to determine a risk score for the transaction, and wherein the method further utilizes information received from a demand deposit account (DDA) on which the promissory payment is drawn for use in enhancing the scoring process, the method comprising:

identifying the promissory payment for which the merchant desires risk assessment;

invoking one or more pre-scoring rules to evaluate the financial transaction;

determining if additional DDA information is needed to evaluate the financial transaction;

accessing DDA access path rules;

if the DDA access path rules specify a merchant stipulated DDA access path, selecting, by the one or more processors, the merchant stipulated DDA access path;

if the DDA access path rules do not specify a merchant stipulated DDA access path, and if additional DDA access is needed, selecting, via an access path determination engine, a DDA information source based at least in part on the DDA access path rules, wherein the access path determination engine is executable by the one or more processors, and receiving information associated with the DDA against which the promissory payment is drawn;

calculating an initial risk score for the transaction;

selectively utilizing the information from the DDA in conjunction with the initial risk score to enhance the risk score for the transaction;

invoking one or more scoring rule matrix to evaluate whether to assess additional DDA information;

invoking the access path determination engine in order to select an expedient DDA access path;

accessing additional associated information and using at least some of the received information and the additional associated information to perform a risk assessment indicative of a level of risk associated with accepting the promissory payment;

invoking post-score rules to determine whether further risk assessment is desirable to confirm or to overturn the assessment and whether further additional DDA information is needed;

invoking the access path determination engine if desirable in order to select a DDA access path;

assessing further additional DDA information via the DDA access path selected by the access path determination engine;

performing further risk assessment, if desirable, based at least in part on the further additional DDA info to determine if a risk level associated with accepting the promissory payment is acceptable or unacceptable; and providing an indication of the risk assessment associated with accepting the promissory payment to the merchant.

64. The method of claim 63, wherein the promissory payment is a tendered check drawn on the DDA.

65. The method of claim 63, wherein the information from the DDA comprises information about the sufficiency of funds in the DDA to cover the amount of the promissory payment and about whether the DDA is open or closed.

66. The method of claim 63, wherein providing an indication of the risk assessment to the merchant comprises advising the merchant whether to accept or to decline the promissory payment.

67. The method of claim 63, wherein providing an indication of the risk assessment to the merchant comprises advising the merchant via a distributed electronic network.

68. The method of claim 63, wherein receiving information from the DDA comprises receiving the information from a source belonging to the group consisting of: an issuing financial institution associated with the demand deposit account, a third party entity that provides access to the issuing financial institution, a third party entity that maintains a copy of demand deposit information from the issuing financial institution, and an internal database that stores a copy of demand deposit information from the issuing financial institution.

69. The method of claim 63, further comprising accessing and utilizing stored information about the merchant comprising a merchant type categorization that groups the merchant with other merchants exhibiting similar customer purchase patterns and similar promissory payment risk patterns to enhance the risk score.

70. The method of claim 63, further comprising accessing and utilizing stored information about a customer proffering the promissory payment to enhance the risk score, wherein the stored information comprises information relevant to an assessment of the risk of accepting a promissory payment from the customer.

71. The method of claim 70, wherein the information about the customer comprises information about the customer's payment history.

72. The method of claim 63, wherein calculating an initial risk score comprises taking into consideration at least one of: information about the promissory payment, information about the DDA, information about the merchant, and information about a customer proffering the promissory payment, information about available sources of DDA information, and information about a probable amount of financial gain associated with accepting the promissory payment if the payment is not initially paid.

73. The method of claim 63, wherein the utilizing the DDA information to enhance the initial risk score is performed using a system of decision rules.

74. The method of claim 63, wherein the utilizing the DDA information to enhance the initial risk score comprises recalculating the risk score.

75. The method of claim 63, wherein utilizing the DDA information to enhance the risk score comprises determining if sufficient funds exist in the demand deposit account to cover the proffered promissory payment and wherein providing an indication of the assessment comprises advising the merchant not to accept the proffered payment when there are insufficient funds in the demand deposit account.

76. The method of claim 63, wherein utilizing the DDA information to enhance the risk score comprises determining if sufficient funds exist in the DDA to cover the proffered promissory payment and taking into consideration other information, said other information comprising at least one of: payment history information associated with the DDA, promissory payment history information associated with the merchant and with other merchants exhibiting similar promissory payment risk patterns, information about the transaction, and a probable amount of late fees or other form of financial gain if the promissory payment is not initially cashable, such that providing the indication of the risk assessment may comprise advising the merchant to accept the proffered payment even when there are insufficient funds in the demand deposit account.

77. The method of claim 63, wherein calculating the initial risk score comprises taking into consideration the information about the demand deposit account.

78. The method of claim 63, wherein receiving information about the demand deposit account comprises:
   determining if requesting demand deposit information is desirable for performing the risk assessment;
   selecting a source of the demand deposit account information based upon the determination;
   transmitting a request for demand deposit account information to the selected source of the demand deposit information; and
   receiving the information about the demand deposit account from the selected source.

79. The method of claim 78, wherein determining if requesting DDA information is desirable is based at least in part on at least one of the group consisting of: the amount of the proffered promissory payment, payment history information associated with the DDA, auxiliary services offered by available sources of DDA information, resource costs associated with accessing DDA information from sources, a merchant category assigned to the merchant which is indicative of risk patterns associated with promissory payments proffered to merchants assigned to the category, a merchant agreement stipulating circumstances under which requesting DDA information is desirable, and a merchant agreement stipulating preferred sources of demand deposit information.

\* \* \* \* \*